(12) United States Patent
Tatenuma et al.

(10) Patent No.: US 10,466,075 B2
(45) Date of Patent: Nov. 5, 2019

(54) MAGNETIC DETECTION APPARATUS

(71) Applicant: Mitsubishi Electric Corporation, Tokyo (JP)

(72) Inventors: Yoshinori Tatenuma, Tokyo (JP); Masahiro Yokotani, Tokyo (JP); Akira Koshimizu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 246 days.

(21) Appl. No.: 15/524,313

(22) PCT Filed: Mar. 5, 2015

(86) PCT No.: PCT/JP2015/056457
§ 371 (c)(1),
(2) Date: May 4, 2017

(87) PCT Pub. No.: WO2016/139791
PCT Pub. Date: Sep. 9, 2016

(65) Prior Publication Data
US 2018/0292236 A1    Oct. 11, 2018

(51) Int. Cl.
*G01D 5/244* (2006.01)
*G01D 5/245* (2006.01)

(52) U.S. Cl.
CPC ......... *G01D 5/2448* (2013.01); *G01D 5/2451* (2013.01)

(58) Field of Classification Search
None
See application file for complete search history.

(56) References Cited

U.S. PATENT DOCUMENTS

| 7,557,567 B2 * | 7/2009 | Sakanoue | G01D 5/2451 324/207.21 |
| 2007/0285086 A1 * | 12/2007 | Yokotani | G01D 5/24438 324/207.21 |

(Continued)

FOREIGN PATENT DOCUMENTS

| JP | 4129030 B2 | 7/2008 |
| JP | 2010-101747 A | 5/2010 |

OTHER PUBLICATIONS

International Search Report for application No. PCT/JP2015/056457 dated Apr. 28, 2015.

(Continued)

*Primary Examiner* — Melissa J Koval
*Assistant Examiner* — Nasima Monsur
(74) *Attorney, Agent, or Firm* — Sughrue Mion, PLLC; Richard C. Turner

(57) ABSTRACT

There is provided a magnetic detection apparatus in which based on a second comparison signal or a first comparison signal, a second analog/digital conversion circuit or a first analog/digital conversion circuit converts a second amplification signal or a first amplification signal into a digital value at a time when the peak value of the first amplification signal or the second amplification signal is detected or at a time when the bottom value of the first amplification signal or the second amplification signal is detected, as the case may be, and that can implement at least one of actions in which based on comparison between the digital value converted and a predetermined reference value, a second threshold value adjusting apparatus or a first threshold value adjusting apparatus adjusts a second threshold value or a first threshold value, as the case may be.

18 Claims, 19 Drawing Sheets

(56) References Cited

U.S. PATENT DOCUMENTS

2010/0106452 A1* 4/2010 Tatenuma ............ G01D 5/2451
702/150
2010/0207621 A1* 8/2010 Yano .................. G01R 33/0023
324/247

OTHER PUBLICATIONS

Communication dated Dec. 5, 2017, from the Japanese Patent Office in counterpart application No. 2017-503283.

* cited by examiner

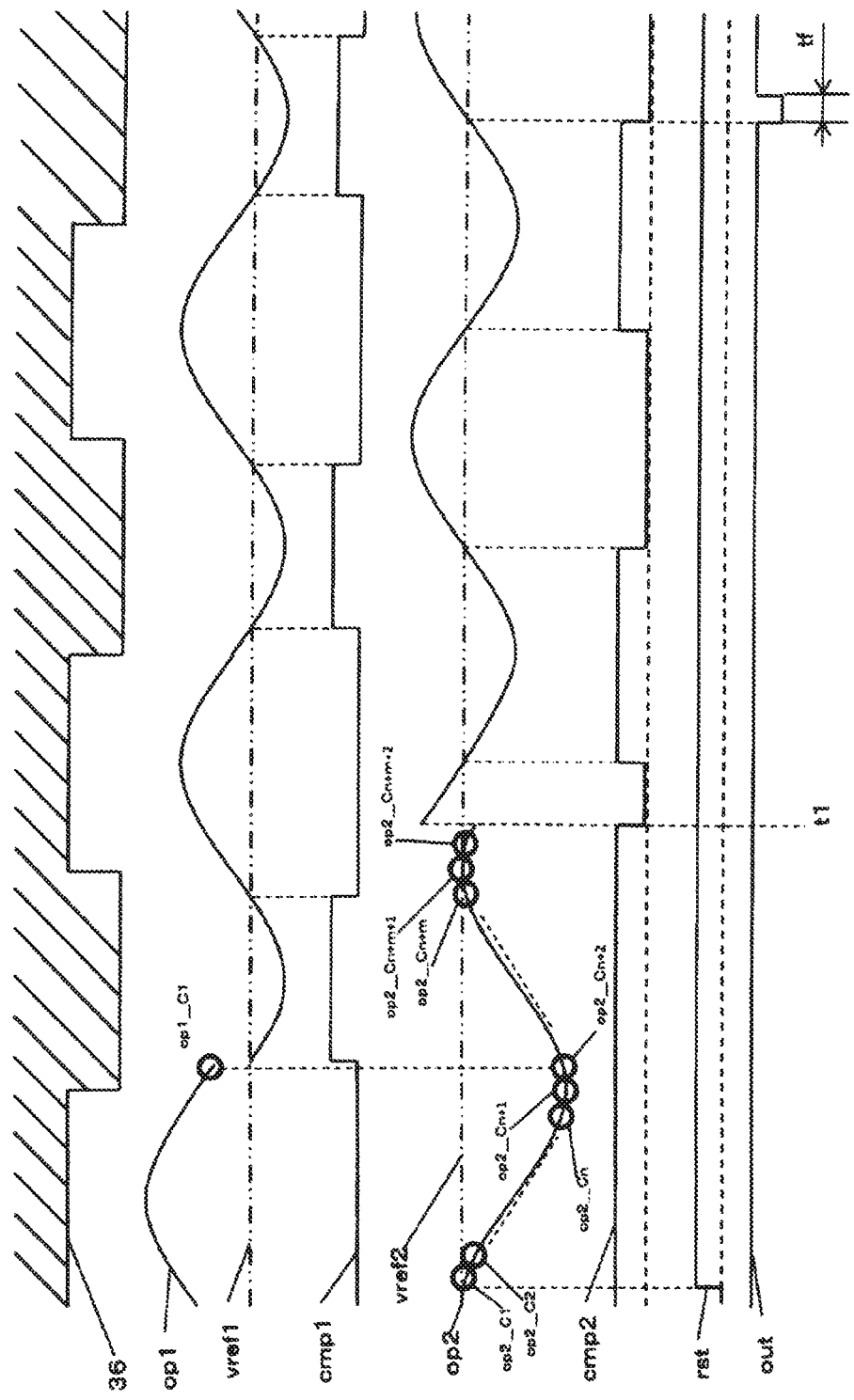

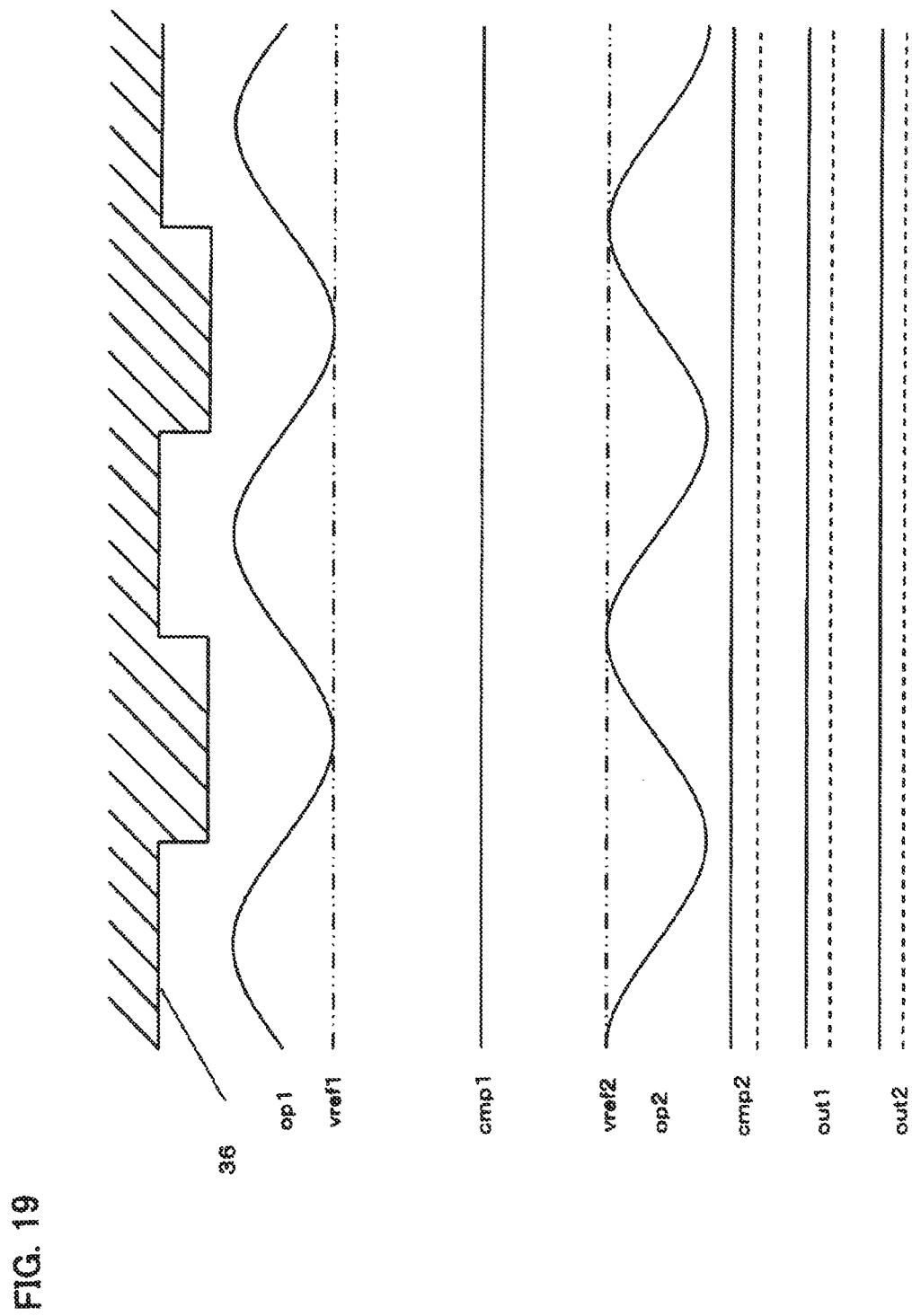

MAGNETIC DETECTION APPARATUS

CROSS REFERENCE TO RELATED APPLICATIONS

This application is a National Stage of International Application No. PCT/JP2015/056457, filed on Mar. 5, 2015, the contents of all of which are incorporated herein by reference in their entirety.

TECHNICAL FIELD

The present invention relates to a magnetic detection apparatus utilizing magnetoelectric conversion elements and particularly to a magnetic detection apparatus that detects the moving direction and the like of a magnetic moving body by detecting a magnetic-field change caused by travel of the magnetic moving body.

BACKGROUND ART

As is well known, there have been proposed various kinds of magnetic detection apparatuses (e.g., refer to Patent Document 1) that each have a bridge circuit for converting a change in the resistance value of a magnetoelectric conversion element, caused by a change in a magnetic field, i.e., a magnetic flux density, into a voltage and then outputting the voltage and that each detect the traveling direction and the like of a magnetic moving body, which magnetically provides an effect to the magnetoelectric conversion element, based on the output voltage of the bridge circuit. Such a magnetic detection apparatus is utilized, for example, as a vehicle rotation sensor that detects the rotation direction and the rotation speed of a vehicle engine.

A conventional magnetic detection apparatus disclosed in Patent Document 1 includes a first bridge circuit in which respective electrodes are formed at both ends of magnetoelectric conversion elements arranged in such a way as to face a magnetic moving body that travels, a second bridge circuit in which respective electrodes are formed at both ends of other magnetoelectric conversion elements that are arranged at positions different from those of the magnetoelectric conversion elements in the first bridge circuit and face the magnetic moving body, a first differential amplification circuit that amplifies a sinusoidal output voltage of the first bridge circuit, a second differential amplification circuit that amplifies a sinusoidal output voltage of the second bridge circuit, a first comparison circuit that compares the output signal of the first differential amplification circuit with a predetermined threshold value and then generates a rectangular-wave output signal, a second comparison circuit that compares the output signal of the second differential amplification circuit with a predetermined threshold value and then generates a rectangular-wave output signal, a first output circuit that drives a first switching device, based on the output signal of the first comparison circuit, and a second output circuit that drives a second switching device, based on the output signal of the second comparison circuit; the conventional magnetic detection apparatus generates a first output signal having a rectangular-wave shape, based on the operation of the first switching device, and generates a second output signal having a rectangular-wave shape, based on the operation of the second switching device.

There exists a phase difference of approximately 90° between the respective output voltages of the first and second differential amplification circuits; therefore, at a rising time of the output signal of the first comparison circuit, the output voltage of the second differential amplification circuit is at the bottom position or the peak position thereof, and at a falling time of the output signal of the second comparison circuit, the output voltage of the second differential amplification circuit is at the peak position or the bottom position thereof; thus, the traveling direction of the magnetic moving body can be determined based on the mutual relationship between the first and second output signals.

However, when for example, due to a productional or thermal variation in the characteristics of a magnetoelectric conversion element, there occurs an offset between the output voltage of the first differential amplification circuit and the output voltage of the second differential amplification circuit when the temperature or the like of the environment where the magnetoelectric conversion element is disposed changes; then, eventually, there occurs a variation in the respective falling times or the respective rising times of the first output signal and the second output signal. As a result, the detecting accuracy may be deteriorated.

Accordingly, the foregoing conventional magnetic detection apparatus is configured in such a way that at the falling and rising times of the output signal of the first comparison circuit, the value of the output voltage of the second differential amplification circuit is converted into a digital value, that at the falling and rising times of the output signal of the second comparison circuit, the value of the output voltage of the first differential amplification circuit is converted into a digital value, and that by use of the average value of these digital values, the respective threshold values in the first comparison circuit and the second comparison circuit are adjusted. As a result, even when the foregoing offset occurs, the first comparison circuit can always compare the threshold value with the value, at the center of amplitude, of the output voltage of the first differential amplification circuit and can output an output signal, and the second comparison circuit can always compare the threshold value with the value, at the center of amplitude, of the output voltage of the second differential amplification circuit and can output an output signal; therefore, it is made possible that the detecting accuracy is suppressed from undergoing the effect of the variation in the respective falling times or the respective rising times of the first differential amplification circuit and the second differential amplification circuit and that the traveling direction of the magnetic moving body is accurately detected.

Moreover, with regard to such a magnetic detection apparatus as described above, there has already been disclosed a technology in which the switching device is driven based on PWM (Pulse Width Modulation) so that the first output signal and the second output signal are generated (e.g., refer to Patent Document 2).

PRIOR ART REFERENCE

Patent Document

[Patent Document 1] Japanese Patent Publication No. 4129030

[Patent Document 2] Japanese Patent Application Laid-Open No. 2010-101747

DISCLOSURE OF THE INVENTION

Problems to be Solved by the Invention

As described above, the conventional magnetic detection apparatus can accurately detect the traveling direction, such as the rotation direction, of the magnetic moving body; however, because in the case where the amplitude range of the output voltage of the differential amplification circuit deviates from the potential of the threshold value of the comparison circuit, the output signal of the comparison circuit is held at a fixed value and no time for adjusting the threshold value occurs, the first output and the second output are held at respective fixed values; thus, there is posed a problem that the rotation direction and the like of the magnetic moving body cannot be detected.

The present invention has been implemented in order to solve the foregoing problems in a conventional magnetic detection apparatus; the objective thereof is to provide a magnetic detection apparatus that can accurately detect the traveling direction and the like of a magnetic moving body even when the amplitude range of the output signal of a bridge circuit deviates from the threshold value of a comparison circuit.

In addition, the objective of the present invention is to provide a magnetic detection apparatus that can accurately detect the traveling direction and the like of a magnetic moving body even when the amplitude range of the output voltage of a differential amplification circuit deviates from the threshold value of a comparison circuit.

Means for Solving the Problems

A magnetic detection apparatus according to the present invention includes a first group of magnetoelectric conversion elements that is disposed in such a way as to face a magnetic moving body and that converts a change in a magnetic field, caused by a travel of the magnetic moving body, into a change in an electric quantity, a second group of magnetoelectric conversion elements that is disposed at a position, in a traveling direction of the magnetic moving body, different from the position where the first group of magnetoelectric conversion elements is disposed and that converts a change in a magnetic field, caused by a travel of the magnetic moving body, into a change in an electric quantity, a first comparison circuit that generates a binarized, first comparison signal, based on comparison between a first threshold value and a first output signal based on conversion into the electric quantity by the first group of magnetoelectric conversion elements, a second comparison circuit that generates a binarized, second comparison signal, based on comparison between a second threshold value and a second output signal based on conversion into the electric quantity by the second group of magnetoelectric conversion elements, a first threshold value adjusting apparatus that can adjust the first threshold value, a second threshold value adjusting apparatus that can adjust the second threshold value, a first analogue/digital conversion circuit that converts the first output signal into a digital value, and a second analogue/digital conversion circuit that converts the second output signal into a digital value; the magnetic detection apparatus is characterized in that it is made possible to implement at least one of actions (1) and (2) below:

(1) the second analogue/digital conversion circuit converts the second output signal into a digital value at a time when the peak value or the bottom value of the first output signal is detected, and then the second threshold value adjusting apparatus adjusts the second threshold value, based on comparison between a predetermined reference value and said digital value obtained through the conversion; and (2) the first analogue/digital conversion circuit converts the first output signal into a digital value at a time when the peak value or the bottom value of the second output signal is detected, and then the first threshold value adjusting apparatus adjusts the first threshold value, based on comparison between a predetermined reference value and said digital value obtained through the conversion.

A magnetic detection apparatus according to the present invention includes a first group of magnetoelectric conversion elements that is disposed in such a way as to face a magnetic moving body and that converts a change in a magnetic field, caused by a travel of the magnetic moving body, into a change in an electric quantity, a second group of magnetoelectric conversion elements that is disposed at a position, in a traveling direction of the magnetic moving body, different from the position where the first group of magnetoelectric conversion elements is disposed and that converts a change in a magnetic field, caused by a travel of the magnetic moving body, into a change in an electric quantity, a first amplification circuit that amplifies, based on a first reference potential, a first output signal based on conversion into the electric quantity by the first group of magnetoelectric conversion elements and then outputs a first amplification signal, a second amplification circuit that amplifies, based on a second reference potential, a second output signal based on conversion into the electric quantity by the second group of magnetoelectric conversion elements and then outputs a second amplification signal, a first comparison circuit that compares the first amplification signal with a first threshold value and then outputs a binarized, first comparison signal, a second comparison circuit that compares the second amplification signal with a second threshold value and then outputs a binarized, second comparison signal, a first reference potential adjusting apparatus that can adjust the first reference potential in the first amplification circuit, a second reference potential adjusting apparatus that can adjust the second reference potential in the second amplification circuit, a first analogue/digital conversion circuit that converts the first amplification signal into a digital value, and a second analogue/digital conversion circuit that converts the second amplification signal into a digital value; the magnetic detection apparatus is characterized in that it is made possible to implement at least one of actions (1) and (2) below:

(1) the second analogue/digital conversion circuit converts the second amplification signal into a digital value at a time when the peak value or the bottom value of the first output signal is detected, and then the second reference potential adjusting apparatus adjusts the second reference potential, based on comparison between a predetermined reference value and said digital value obtained through the conversion; and (2) the first analogue/digital conversion circuit converts the first output signal into a digital value at a time when the peak value or the bottom value of the second output signal is detected, and then the first reference potential adjusting apparatus adjusts the first reference potential, based on comparison between a predetermined reference value and said digital value obtained through the conversion.

Advantage of the Invention

A magnetic detection apparatus according to the present invention includes
a first group of magnetoelectric conversion elements that is disposed in such a way as to face a magnetic moving body and that converts a change in a magnetic field, caused by a travel of the magnetic moving body, into a change in an electric quantity,
a second group of magnetoelectric conversion elements that is disposed at a position, in a traveling direction of the magnetic moving body, different from the position where the first group of magnetoelectric conversion elements is disposed and that converts a change in a magnetic field, caused by a travel of the magnetic moving body, into a change in an electric quantity,
a first comparison circuit that generates a binarized, first comparison signal, based on comparison between a first threshold value and a first output signal based on conversion into the electric quantity by the first group of magnetoelectric conversion elements,
a second comparison circuit that generates a binarized, second comparison signal, based on comparison between a second threshold value and a second output signal based on conversion into the electric quantity by the second group of magnetoelectric conversion elements,
a first threshold value adjusting apparatus that can adjust the first threshold value,
a second threshold value adjusting apparatus that can adjust the second threshold value,
a first analogue/digital conversion circuit that converts the first output signal into a digital value, and
a second analogue/digital conversion circuit that converts the second output signal into a digital value; the magnetic detection apparatus is configured in such a way that it is made possible to implement at least one of actions (1) and (2) below:
(1) the second analogue/digital conversion circuit converts the second output signal into a digital value at a time when the peak value or the bottom value of the first output signal is detected, and then the second threshold value adjusting apparatus adjusts the second threshold value, based on comparison between a predetermined reference value and said digital value obtained through the conversion; and
(2) the first analogue/digital conversion circuit converts the first output signal into a digital value at a time when the peak value or the bottom value of the second output signal is detected, and then the first threshold value adjusting apparatus adjusts the first threshold value, based on comparison between a predetermined reference value and said digital value obtained through the conversion.

As a result, it is made possible to obtain a magnetic detection apparatus that can accurately detect the traveling direction and the like of a magnetic moving body even when the amplitude range of the output signal of a bridge circuit deviates from the threshold value of a comparison circuit.

A magnetic detection apparatus according to the present invention includes
a first group of magnetoelectric conversion elements that is disposed in such a way as to face a magnetic moving body and that converts a change in a magnetic field, caused by a travel of the magnetic moving body, into a change in an electric quantity,
a second group of magnetoelectric conversion elements that is disposed at a position, in a traveling direction of the magnetic moving body, different from the position where the first group of magnetoelectric conversion elements is disposed and that converts a change in a magnetic field, caused by a travel of the magnetic moving body, into a change in an electric quantity,
a first amplification circuit that amplifies, based on a first reference potential, a first output signal based on conversion into the electric quantity by the first group of magnetoelectric conversion elements and then outputs a first amplification signal,
a second amplification circuit that amplifies, based on a second reference potential, a second output signal based on conversion into the electric quantity by the second group of magnetoelectric conversion elements and then outputs a second amplification signal,
a first comparison circuit that compares the first amplification signal with a first threshold value and then outputs a binarized, first comparison signal,
a second comparison circuit that compares the second amplification signal with a second threshold value and then outputs a binarized, second comparison signal,
a first reference potential adjusting apparatus that can adjust the first reference potential in the first amplification circuit,
a second reference potential adjusting apparatus that can adjust the second reference potential in the second amplification circuit,
a first analogue/digital conversion circuit that converts the first amplification signal into a digital value, and
a second analogue/digital conversion circuit that converts the second amplification signal into a digital value; the magnetic detection apparatus is configured in such a way that it is made possible to implement at least one of actions (1) and (2) below:
(1) the second analogue/digital conversion circuit converts the second amplification signal into a digital value at a time when the peak value or the bottom value of the first output signal is detected, and then the second reference potential adjusting apparatus adjusts the second reference potential, based on comparison between a predetermined reference value and said digital value obtained through the conversion; and
(2) the first analogue/digital conversion circuit converts the first output signal into a digital value at a time when the peak value or the bottom value of the second output signal is detected, and then the first reference potential adjusting apparatus adjusts the first reference potential, based on comparison between a predetermined reference value and said digital value obtained through the conversion.

Thus, the objective thereof is to provide a magnetic detection apparatus that can accurately detect the traveling direction and the like of a magnetic moving body even when the amplitude range of the output signal of a amplification circuit deviates from the threshold value of a comparison circuit.

BRIEF DESCRIPTION OF THE DRAWINGS

FIG. 10 is a waveform chart for explaining the operation of a magnetic detection apparatus according to Embodiment 3 of the present invention;

FIG. 19 is a waveform chart for explaining the magnetic detection apparatus based on the technology that is a basis of the present invention.

BEST MODE FOR CARRYING OUT THE INVENTION

Before a magnetic detection apparatus according to the present invention is explained, the technology, which is a basis of the magnetic detection apparatus according to the present invention, will be explained, at first.

[Technology as a Basis of the Present Invention]

Figure 16A:
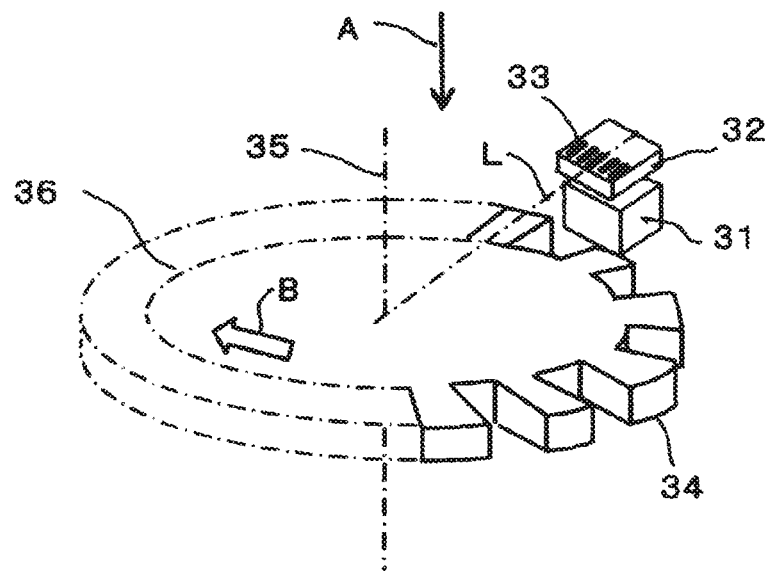
FIG. 16A is an explanatory view illustrating the configuration of a magnetic circuit of a magnetic detection apparatus based on a technology that is a basis of the present invention.
Figure 16B:
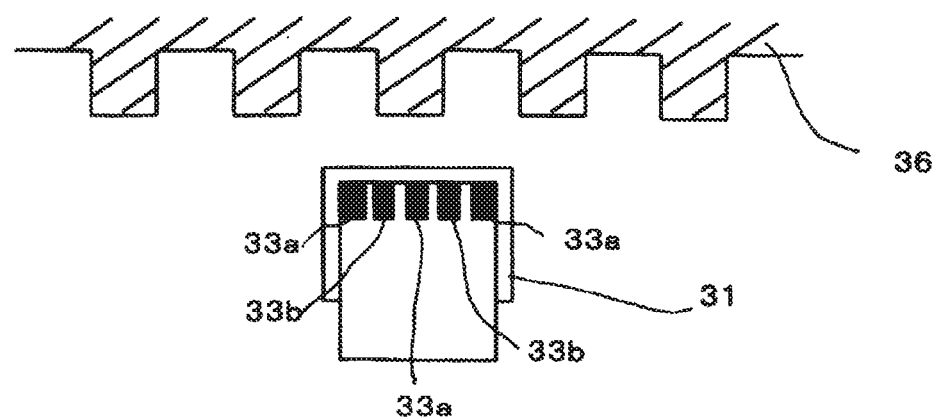
FIG. 16B is an explanatory view illustrating the configuration of the magnetic circuit of the magnetic detection apparatus based on the technology that is a basis of the present invention, at a time when the magnetic circuit is viewed from the direction of the arrow A in FIG. 16A.

FIG. 16A is an explanatory view illustrating the configuration of a magnetic circuit of a magnetic detection apparatus based on a technology that is a basis of the present invention; FIG. 16B is an explanatory view illustrating the configuration of the magnetic circuit of the magnetic detection apparatus based on the technology that is a basis of the present invention, at a time when the magnetic circuit is viewed from the direction of the arrow A in FIG. 16A. In FIGS. 16A and 16B, a magnetic moving body 36 formed of a magnetic disc can rotate in the direction indicated by the arrow B or in the direction opposite to the direction indicated by the arrow B with respect to the rotation axis 35. The magnetic moving body 36 rotates, for example, in synchronization with the rotation of the crankshaft of an engine. In the following explanation, the rotation in the direction indicated by the arrow B and the rotation in the direction opposite to the direction indicated by the arrow B are referred to as a forward rotation and a backward rotation, respectively. In the outer circumference of the magnetic moving body 36, a plurality of magnetic protrusions 34 are formed in such a way as to be spaced a predetermined gap apart from one another.

A magnet 31 is disposed in such a way as to face the magnetic protrusion 34 of the magnetic moving body 36 through a predetermined gap and is magnetized in the direction toward the rotation axis 35. Two or more groups 33 of magnetoelectric conversion elements are provided on a substrate 32 fixed to the magnet 31. The magnet 31 and the magnetic moving body 36 form part of a magnetic circuit. The two or more groups 33 of magnetoelectric conversion elements includes a first group 33a of magnetoelectric conversion elements that are utilized in an after-mentioned first bridge circuit and a second group 33b of magnetoelectric conversion elements that are utilized in an after-mentioned second bridge circuit. As illustrated in FIGS. 16A and 16B, the first group 33a of magnetoelectric conversion elements and the second group 33b of magnetoelectric conversion elements are alternately arranged in such away as to face the magnetic protrusions 34 of the magnetic moving body 36 and are arranged symmetrically with each other with respect to a center line L, of the magnet 31, that is perpendicular to the rotation axis 35.

Here, the magnetoelectric conversion element denotes a device, such as an AMR (Anisotropic Magneto Resistance), a GMR (Giant Magneto Resistance), a TMR (Tunnel Magneto Resistance), or a Hall element, that can convert a change in a magnetic field or magnetic flux into an electric signal.

Figure 17:
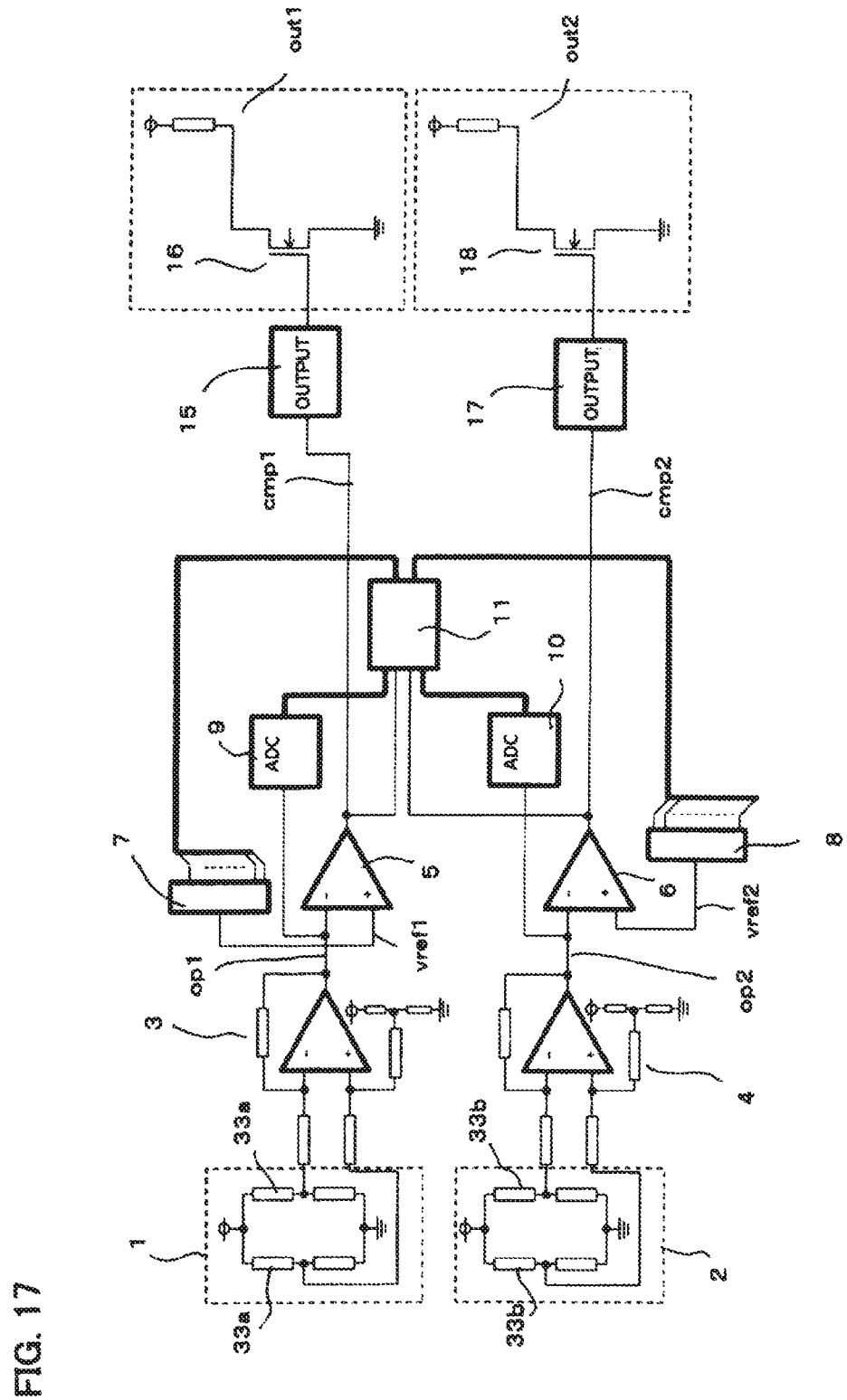
FIG. 17 is a circuit configuration diagram of the magnetic detection apparatus based on the technology that is a basis of the present invention.

FIG. 17 is a circuit configuration diagram of the magnetic detection apparatus based on the technology that is a basis of the present invention. In FIG. 17, respective electrodes are provided at both ends of the first group 33a of magnetoelectric conversion elements in a first bridge circuit 1; one of the electrodes is connected with a power source and the other one thereof is connected with the ground potential portion. Respective electrodes are provided at both ends of the second group 33b of magnetoelectric conversion elements in a second bridge circuit 2; one of the electrodes is connected with a power source and the other one thereof is connected with the ground potential portion.

The negative-polarity input terminal of the first differential amplification circuit 3 is connected through a resistor with one of the output terminals of the first bridge circuit 1; the positive-polarity input terminal of the first differential amplification circuit 3 is connected through a resistor with the other one of the output terminals of the first bridge circuit 1; the first differential amplification circuit 3 outputs a first differential amplification signal op1 having a sinusoidal shape, based on the output voltage of the first bridge circuit 1.

The negative-polarity input terminal of the second differential amplification circuit 4 is connected through a resistor with one of the output terminals of the second bridge circuit 2; the positive-polarity input terminal of the second differential amplification circuit 4 is connected through a resistor with the other one of the output terminals of the second bridge circuit 2; the second differential amplification circuit 4 outputs a second differential amplification signal op2 having a sinusoidal shape, based on the output voltage of the second bridge circuit 2. Here, there exists a phase difference of approximately 90° between the first differential amplification signal op1 and the second differential amplification signal op2.

The negative-polarity input terminal of the first comparison circuit 5 is connected with the output terminal of the first differential amplification circuit 3 and the positive-polarity input terminal thereof is connected with the output terminal of an after-mentioned first digital/analogue conversion circuit (referred to as a first DAC, hereinafter) 7; the first comparison circuit 5 outputs a first comparison signal cmp1 having a rectangular-wave shape, based on comparison between the inputted first differential amplification signal op1 and a first threshold value vref1.

The negative-polarity input terminal of the second comparison circuit 6 is connected with the output terminal of the second differential amplification circuit 4 and the positive-polarity input terminal thereof is connected with the output terminal of an after-mentioned second digital/analogue conversion circuit (referred to as a second DAC, hereinafter) 8; the second comparison circuit 6 outputs a second comparison signal cmp2 having a rectangular-wave shape, based on comparison between the inputted second differential amplification signal op2 and a second threshold value vref2.

A first analogue/digital conversion circuit (referred to as a first ADC, hereinafter) 9 converts the first differential amplification signal op1, which is an analogue signal, into a digital signal and inputs the digital signal to a calculation circuit 11. A second analogue/digital conversion circuit (referred to as a second ADC, hereinafter) 10 converts the second differential amplification signal op2, which is an analogue signal, into a digital signal and inputs the digital signal to the calculation circuit 11.

A first DAC 7 converts a digital signal from the calculation circuit 11 into an analogue signal and inputs the analogue signal, as the first threshold value vref1, to the positive-polarity input terminal of the first comparison circuit 5. A second DAC 8 converts a digital signal from the calculation circuit 11 into an analogue signal and inputs the analogue signal, as the second threshold value vref2, to the positive-polarity input terminal of the second comparison circuit 6.

Based on the first comparison signal cmp1 inputted from the first comparison circuit 5, a first output circuit 15 drives a first switching device 16 formed of a transistor. Based on the second comparison signal cmp2 inputted from the second comparison circuit 6, a second output circuit 17 drives a second switching device 18 formed of a transistor. A first detection signal out1 having a rectangular-wave shape is generated in accordance with the on/off operation state of the first switching device 16 driven by the first output circuit 15. A second detection signal out2 having a rectangular-wave shape is generated in accordance with the on/off operation state of the second switching device 18 driven by the second output circuit 17.

Figure 18:
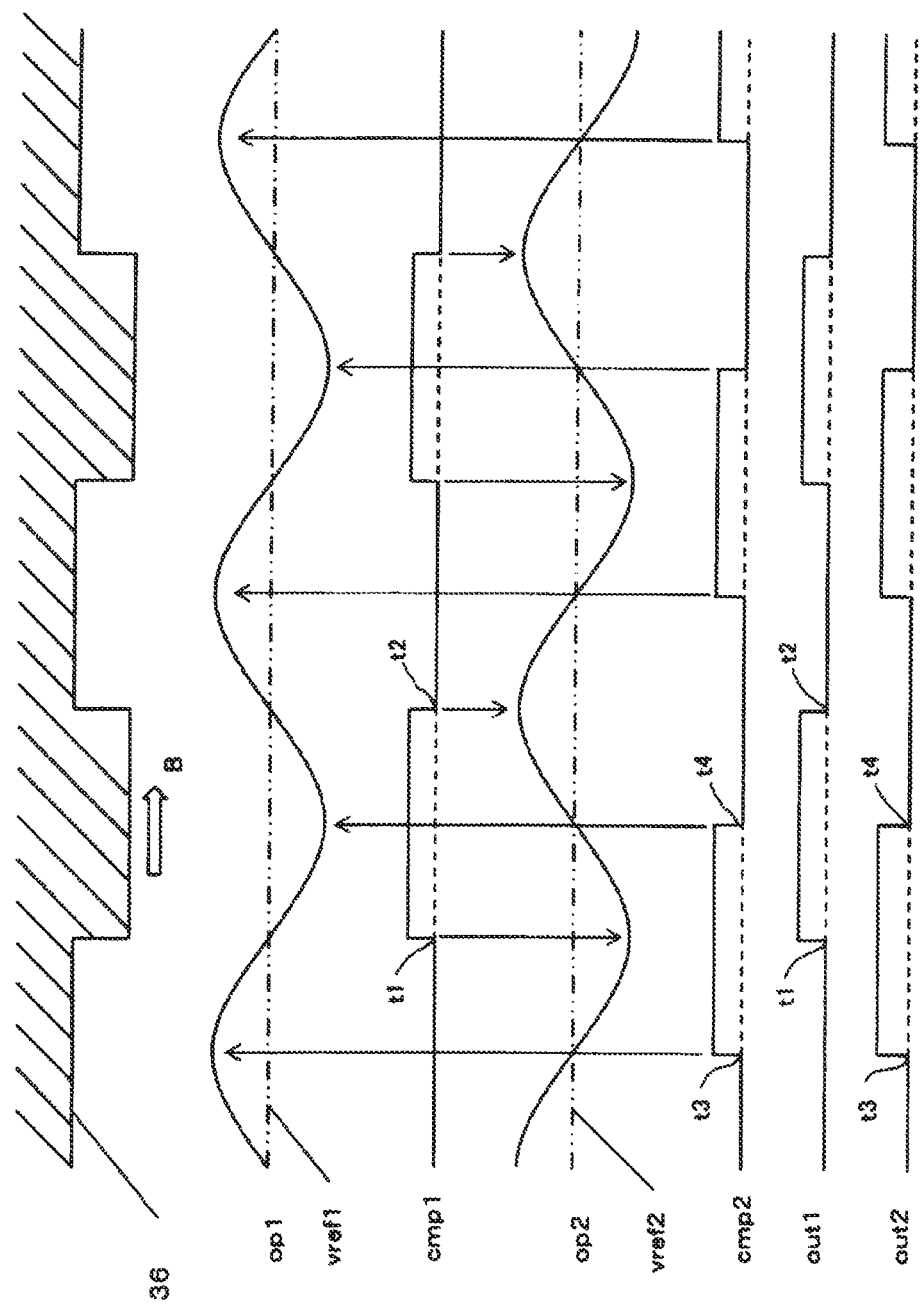
FIG. 18 is a waveform chart of the magnetic detection apparatus based on the technology that is a basis of the present invention.

FIG. 18 is a waveform chart for explaining the magnetic detection apparatus based on the technology that is a basis of the present invention; the abscissa denotes the time; the ordinate denotes the first differential amplification signal op1, the first comparison signal cmp1, the second differential amplification signal op2, the second comparison signal cmp2, the first detection signal out1, and the second detection signal out2, in accordance with the magnetic protrusions 34 of the magnetic moving body 36.

In FIGS. 17 and 18, when the magnetic moving body 36 rotates on the rotation axis 35, the magnetic flux density, i.e., the magnetic field between the magnet 31 and the magnetic moving body 36 periodically changes each time the magnetic protrusions 34 of the magnetic moving body 36 passes therethrough. The respective resistance values of the first group 33a of magnetoelectric conversion elements and the second group 33b of magnetoelectric conversion elements change in response to a change in the magnetic field; as a result, because the respective inter-output-terminal voltages of the first bridge circuit 1 and the second bridge circuit 2 periodically change, the first differential amplification circuit 3 and the second differential amplification circuit 4 output the first differential amplification signal op1 and the second differential amplification signal op2, respectively. Due to the arrangement-position difference between the first group 33a of magnetoelectric conversion elements and the second group 33b of magnetoelectric conversion elements, there exists a phase difference of approximately 90° between the first differential amplification signal op1 and the second differential amplification signal op2, as described above.

The first comparison circuit 5 compares the first differential amplification signal op1 with the first threshold value vref1 and outputs the first comparison signal cmp1. Similarly, the second comparison circuit 6 compares the second differential amplification signal op2 with the second threshold value vref2 and outputs the second comparison signal cmp2. Based on the inputted first comparison signal cmp1, the first output circuit 15 drives the first switching device 16 so that the first detection signal out1 is generated. Similarly, based on the inputted second comparison signal cmp2, the second output circuit 17 drives the second switching device 18 so that the second detection signal out2 is generated.

Provided that the magnetic moving body 36 rotates in the direction indicated by the arrow B, the second comparison signal cmp2 is at its high level at a rising time t1 of the first comparison signal cmp1 and the second comparison signal cmp2 is at its low level at a falling time t2 of the first comparison signal cmp1, because there exists a phase difference of approximately 90° between the first differential amplification signal op1 and the second differential amplification signal op2. Thus, based on the mutual relationship between the respective levels of the first detection signal out1 and the second detection signal out2 that are generated in synchronization with the first comparison signal cmp1 and the second comparison signal cmp2, respectively, it is determined that the magnetic moving body 36 is rotating in the direction indicated by the arrow B, i.e., rotating forward.

In contrast, provided that the magnetic moving body 36 rotates in the direction opposite to the direction indication by the arrow B, the second comparison signal cmp2 is at its low level at a rising time t2 of the first comparison signal cmp1 and the second comparison signal cmp2 is at its high level at a falling time t1 of the first comparison signal cmp1. Thus, based on the mutual relationship between the respective levels of the first detection signal out1 and the second detection signal out2 that are generated in synchronization with the first comparison signal cmp1 and the second comparison signal cmp2, respectively, it is determined that the magnetic moving body 36 is rotating in the direction opposite to the direction indicated by the arrow B, i.e., rotating backward.

However, due to productional and thermal variations in the characteristics of magnetoelectric conversion elements, an assembly variation in the magnetic circuit including the magnet 31 and the magnetic moving body 36, a variation in the circuit configuration, or the like, the respective offsets of the first differential amplification signal op1 and the second differential amplification signal op2 may rise or fall. As a result, variations eventually occur in the respective output falling and rising positions of the first detection signal out1 and the second detection signal out2; therefore, the rotation direction and the rotation position of the magnetic moving body 36 cannot accurately be detected.

Accordingly, in the magnetic detection device based on the technology that is a basis of the present invention, the analogue values, of the second differential amplification signal op2, that correspond to the rising time t1 and the falling time t2 of the first comparison signal cmp1 are converted into digital values by the second ADC 10, and then the digital values are inputted to the calculation circuit 11. The calculation circuit 11 calculates the average value of the inputted digital values. Then, the second DAC 8 converts the calculated average digital value into an analogue value, and the analogue value, as the second threshold value vref2, is inputted to the second comparison circuit 6.

That is to say, the second differential amplification signal op2 takes its bottom value at the rising time t1 of the first comparison signal cmp1 and the second differential amplification signal op2 takes its peak value at the falling time t2 of the first comparison signal cmp1, because there exists a phase difference of approximately 90° between the first differential amplification signal op1 and the second differential amplification signal op2. Accordingly, the average value between the bottom value and the peak value becomes the center value of the sinusoidal wave of the second differential amplification signal op2. Thus, the second DAC 8 converts the average value between the bottom value and the peak value into an analogue value that is utilized as the second threshold value vref2 in the second comparison circuit 6, so that even when such an offset as described above occurs, the second comparison circuit 6 can always perform comparison by utilizing the amplitude center of the second differential amplification signal op2, as the second threshold value vref2; therefore, respective variations in the falling and rising positions of the second detection signal out2 can be suppressed.

Similarly, the analogue values, of the first differential amplification signal op1, that correspond to a rising time t3 and a falling time t4 of the first comparison signal cmp1 are converted into digital values by the first ADC 9, and then the digital values are inputted to the calculation circuit 11. The calculation circuit 11 calculates the average value of the inputted digital values. Then, the first DAC 7 converts the calculated average digital value into an analogue value, and the analogue value, as the first threshold value vref1, is inputted to the first comparison circuit 5.

That is to say, the first differential amplification signal op1 takes its peak value at the rising time t3 of the second comparison signal cmp2 and the first differential amplification signal op1 takes its bottom value at the falling time t4 of the second comparison signal cmp2. Accordingly, the average value between the bottom value and the peak value becomes the center value of the sinusoidal wave of the first differential amplification signal op1. Thus, the first DAC 7 converts the average value between the bottom value and the peak value into an analogue value that is utilized as the first threshold value vref1 in the first comparison circuit 5, so that even when such an offset as described above occurs, the first comparison circuit 5 can always perform comparison by utilizing the amplitude center of the first differential amplification signal op1, as the first threshold value vref1; therefore, respective variations in the falling and rising positions of the first detection signal out1 can be suppressed.

However, in the case where the amplitude range of the first differential amplification signal opt deviates from the potential of the first threshold value vref1, the first detection signal out1 is held at a fixed value. Similarly, in the case where the amplitude range of the second differential amplification signal op2 deviates from the potential of the second threshold value vref2, the second detection signal out2 is held at a fixed value. In such a case, the rotation direction and the like of the magnetic moving body 36 cannot be detected.

FIG. 19 is a waveform chart for explaining the magnetic detection apparatus based on the technology that is a basis of the present invention; FIG. 19 represents the case where the amplitude range of the first differential amplification signal op1 deviates from the potential of the first threshold value vref1 and the amplitude range of the second differential amplification signal op2 deviates from the potential of the second threshold value vref2.

As represented in FIG. 19, in the case where the amplitude ranges of the first differential amplification signal op1 and the second differential amplification signal op2 deviate from the potentials of the first threshold value vref1 and the second threshold value vref2, respectively, the first comparison signal cmp1 and the second comparison signal cmp2 become fixed values; therefore, both the first detection signal out1 and the second detection signal out2 become fixed values and hence information items such as the rotation direction and the like of the magnetic moving body cannot be detected. In addition, also in the case where the amplitude range of the first differential amplification signal op1 or the second differential amplification signal op2 deviates from the potential of the first threshold value vref1 or the second threshold value vref2, as the case may be, information items such as the rotation direction and the like of the magnetic moving body cannot be detected.

A magnetic detection apparatus according to the present invention can solve the foregoing problems in the magnetic detection device as a basis of the present invention. Hereinafter, a magnetic detection apparatus according to Embodiment 1 of the present invention will be explained.

Embodiment 1

Figure 1:
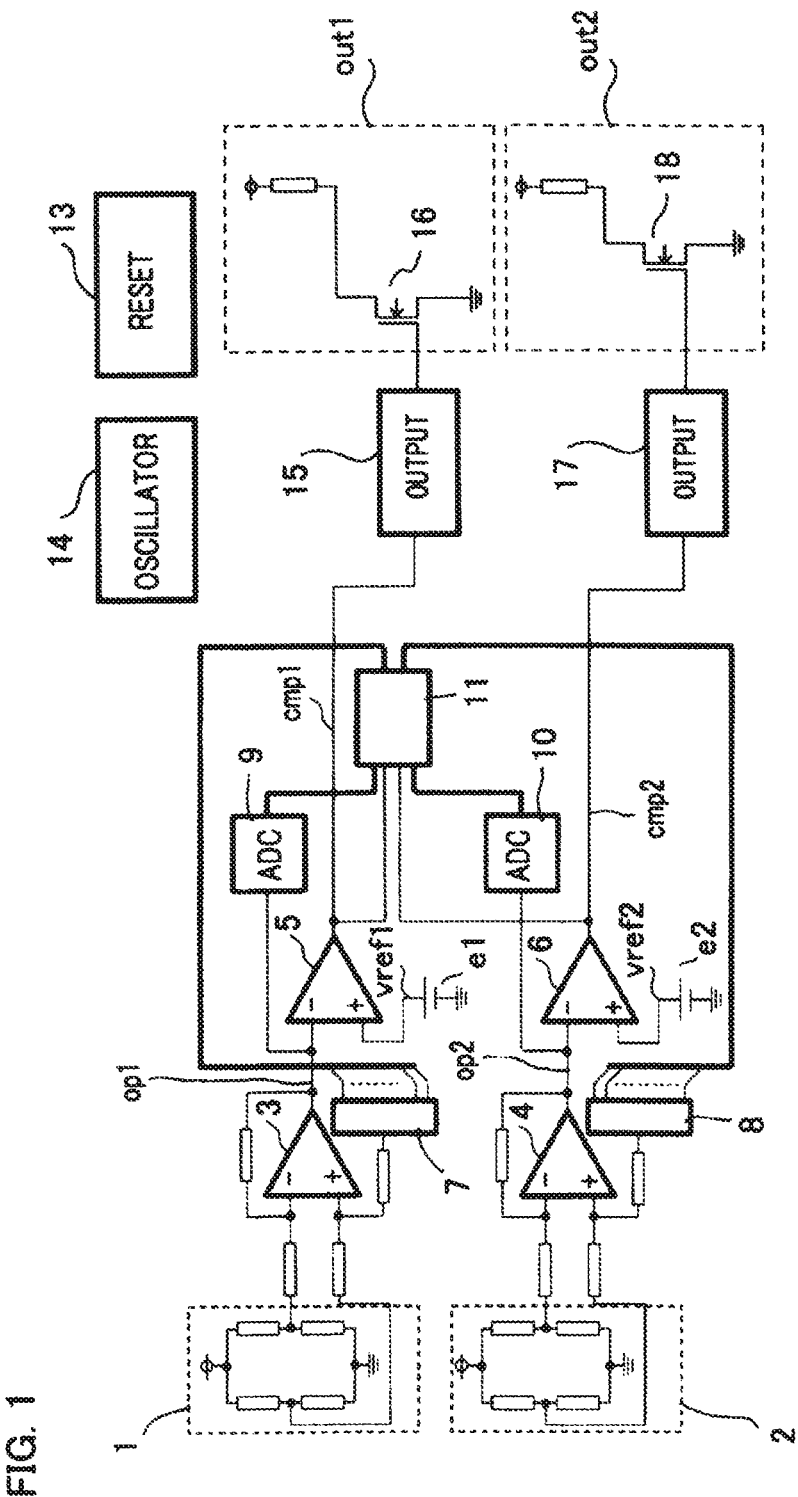
FIG. 1 is a circuit configuration diagram of a magnetic detection apparatus according to Embodiment 1 of the present invention.

The configuration of the magnetic detection apparatus according to Embodiment 1 of the present invention is similar to the configuration, illustrated in FIGS. 16A and 16B, of the foregoing magnetic detection apparatus based on the technology that is a basis of the present invention;

therefore, the explanation therefor will be omitted. FIG. 1 is a circuit configuration diagram of the magnetic detection apparatus according to Embodiment 1 of the present invention.

In FIG. 1, respective electrodes are provided at both ends of the first group 33a of magnetoelectric conversion elements in a first bridge circuit 1; one of the electrodes is connected with a power source and the other one thereof is connected with the ground potential portion. Respective electrodes are provided at both ends of the second group 33b of magnetoelectric conversion elements in a second bridge circuit 2; one of the electrodes is connected with a power source and the other one thereof is connected with the ground potential portion.

The negative-polarity input terminal of a first differential amplification circuit 3 is connected through a resistor with one of the output terminals of the first bridge circuit 1; the positive-polarity input terminal of the first differential amplification circuit 3 is connected through a resistor with the other one of the output terminals of the first bridge circuit 1; the first differential amplification circuit 3 outputs a first differential amplification signal op1 having a sinusoidal shape, based on the output voltage of the first bridge circuit 1.

The negative-polarity input terminal of a second differential amplification circuit 4 is connected through a resistor with one of the output terminals of the second bridge circuit 2; the positive-polarity input terminal of the second differential amplification circuit 4 is connected through a resistor with the other one of the output terminals of the second bridge circuit 2; the second differential amplification circuit 4 outputs a second differential amplification signal op2 having a sinusoidal shape, based on the output voltage of the second bridge circuit 2. Here, there exists a phase difference of approximately 90° between the first differential amplification signal op1 and the second differential amplification signal op2.

The negative-polarity input terminal of a first comparison circuit 5 is connected with the output terminal of the first differential amplification circuit 3 and the positive-polarity input terminal thereof is connected with a first threshold-value power source e1 that outputs a first threshold value vref1. Although the positive-polarity input terminal of the first comparison circuit 5 is connected with the first threshold-value power source e1, which has a fixed value, a hysteresis may be provided in the first threshold value vref1, which is the output voltage of the first threshold-value power source e1. The first comparison circuit 5 outputs a first comparison signal cmp1 having a rectangular-wave shape, based on comparison between the inputted first differential amplification signal op1 and the inputted first threshold value vref1.

The negative-polarity input terminal of a second comparison circuit 6 is connected with the output terminal of the second differential amplification circuit 4, and the positive-polarity input terminal thereof is connected with a second threshold-value power source e2 that outputs a second threshold value vref2. Although the positive-polarity input terminal of the second comparison circuit 6 is connected with the second threshold-value power source e2, which has a fixed value, a hysteresis may be provided in the second threshold value vref2, which is the output voltage of the second threshold-value power source e2. The second comparison circuit 6 outputs a second comparison signal cmp2 having a rectangular-wave shape, based on comparison between the inputted second differential amplification signal op2 and the inputted second threshold value vref2.

A first ADC 9 converts the first differential amplification signal op1, which is an analogue signal, into a digital signal and then inputs the digital signal to a calculation circuit 11. A second ADC 10 converts the second differential amplification signal op2, which is an analogue signal, into a digital signal and then inputs the digital signal to the calculation circuit 11.

A first DAC 7 converts a digital signal from the calculation circuit 11 into an analogue signal and inputs the analogue signal to the positive-polarity input terminal of the first differential amplification circuit 3. A second DAC 8 converts a digital signal from the calculation circuit 11 into an analogue signal and inputs the analogue signal to the positive-polarity input terminal of the second differential amplification circuit 4.

Based on the first comparison signal cmp1 inputted from the first comparison circuit 5, a first output circuit 15 drives a first switching device 16 formed of a transistor. Based on the second comparison signal cmp2 inputted from the second comparison circuit 6, a second output circuit 17 drives a second switching device 18 formed of a transistor. A first detection signal out1 having a rectangular-wave shape is generated in accordance with the on/off operation state of the first switching device 16 driven by the first output circuit 15. A second detection signal out2 having a rectangular-wave shape is generated in accordance with the on/off operation state of the second switching device 18 driven by the second output circuit 17.

As described later, a reset circuit 13 outputs a reset signal having a predetermined level. An oscillator 14 outputs a clock signal in a predetermined period.

As described above, in the magnetic detection device based on the technology as a basis of the present invention, the first DAC 7 and the second DAC 8 are connected with the respective positive-polarity input terminals, of the first comparison circuit 5 and the second comparison circuit 6, that are at the threshold-value potentials thereof; however, in the magnetic detection apparatus according to Embodiment 1 of the present invention, the first DAC 7 and the second DAC 8 are connected with the respective positive-polarity input terminals, of the first differential amplification circuit 3 and the second differential amplification circuit 4, that are at the reference potentials thereof. Other configurations are similar to those of the magnetic detection device, represented in FIG. 17, based on the technology as a basis of the present invention.

Figure 2:
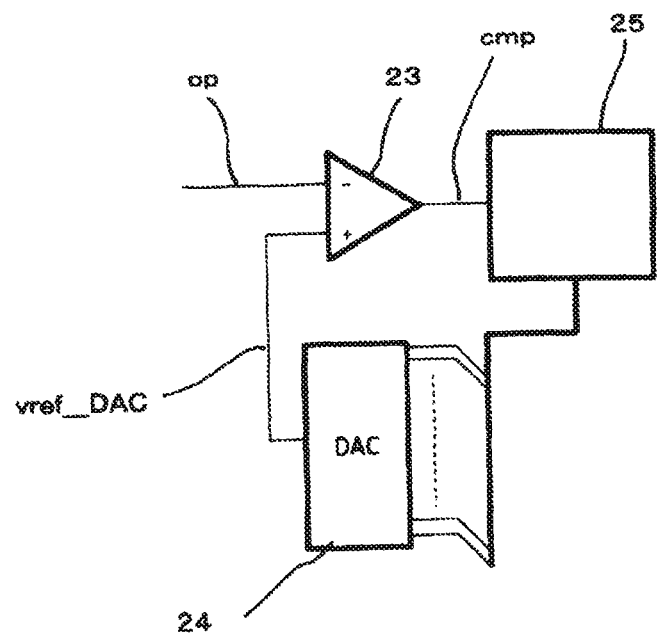
FIG. 2 is a circuit configuration diagram representing an example of analogue/digital conversion circuit.

FIG. 2 is a circuit configuration diagram representing an example of ADC; the ADC is utilized as each of the first ADC 9 and the second ADC 10, described above. In FIG. 2, an analogue/digital-conversion comparison circuit (referred to as an AD comparison circuit, hereinafter) 23 has a positive-polarity input terminal and a negative-polarity input terminal, which is referred to as "op", in particular. The AD comparison circuit 23 whose output terminal is connected with the input terminal of an AD calculation circuit 25 inputs an output signal cmp to the AD calculation circuit 25. An AD DAC 24 whose output terminal is connected with the positive-polarity input terminal of the AD comparison circuit 23 inputs an output signal vref_DAC to the positive-polarity input terminal of the AD DAC 24. The output terminal of the AD calculation circuit 25 is connected with the AD DAC 24 through a bus line.

When the ADC represented in FIG. 2 is utilized as the first ADC 9 in FIG. 1, the first differential amplification signal opt from the first differential amplification circuit 3 is inputted to the input terminal op of the AD comparison circuit 23; when the ADC represented in FIG. 2 is utilized as the second ADC 10, the first differential amplification signal op2 from the second differential amplification circuit 4 is inputted to the input terminal op of the AD comparison circuit 23.

Figure 3:
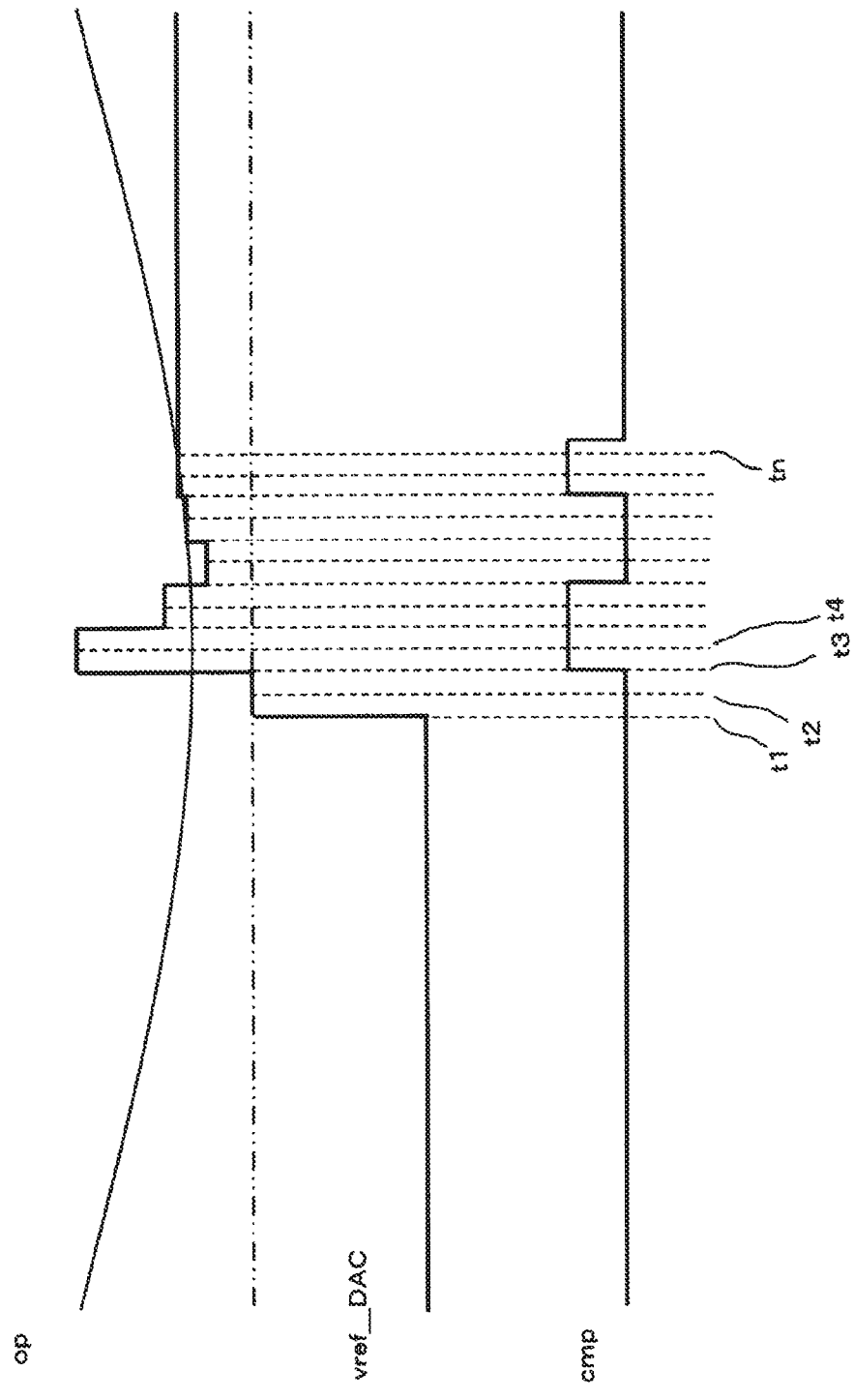
FIG. 3 is a waveform chart for explaining the operation of the analogue/digital conversion circuit.

FIG. 3 is a waveform chart for explaining the operation of the ADC represented in FIG. 2; the abscissa denotes the time, and the ordinate denotes the voltage value at the negative-polarity input terminal op, the output signal vref_DAC of the AD DAC 24, and the output signal cmp of the AD comparison circuit 23. In FIG. 3, as an example, a 6-bit AD DAC will be explained. In FIG. 3, at first, at a time t1 when a trigger is generated, the AD DAC 24 outputs the output signal vref_DAC of a maximum bit (referred to as an MSB). The foregoing MSB denotes the bit that cause "1 [bit]" to generate a maximum potential difference.

Then, at a time t2 after the time t1, the AD calculation circuit 25 determines that the output signal cmp of the AD comparison circuit 23 is at its low level, by use of the clock outputted by the oscillator 14 represented in FIG. 1. In this case, the fact that the output signal cmp of the AD comparison circuit 23 is at its low level suggests that as represented in FIG. 3, the potential at the negative-polarity input terminal op of the AD comparison circuit 23 is higher than that of the output signal vref_DAC of the AD DAC 24. Accordingly, while leaving the MSB in the AD DAC 24, the AD calculation circuit 25 inputs the bit of[MSB-1], which is the second potential, to the AD DAC 24 at a time t3 after the time t2.

Next, at a time t4 after the time t3, the AD calculation circuit 25 determines that the output signal cmp of the AD comparison circuit 23 is at its high level. In this case, the fact that the output signal cmp of the AD comparison circuit 23 is at its high level suggests that as represented in FIG. 3, the potential at the negative-polarity input terminal op of the AD comparison circuit 23 is lower than that of the output signal vref_DAC of the AD DAC 24. Accordingly, while leaving the MSB in the AD DAC 24 and removing the bit of[MSB-1], the AD calculation circuit 25 inputs the bit of[MSB-1] to the AD DAC 24.

As described above, by use of the determination whether the potential at the negative-polarity input terminal op of the AD comparison circuit 23 is higher or lower than the potential of the output signal vref_DAC of the AD DAC 24, there is performed the magnitude-relationship comparison from the MSB to the minimum bit (referred to as LSB, hereinafter). The result of determination on the LSB is obtained at a time tn. The bit left at the time tn (e.g., the MSB is one of the examples) is nothing but the value obtained by converting the analogue potential at the negative-polarity input terminal op of the AD comparison circuit 23 into a digital value. Here, in the following explanation, the time period from the time t1 to the time tn will be referred to as a "conversion time".

Figure 4:
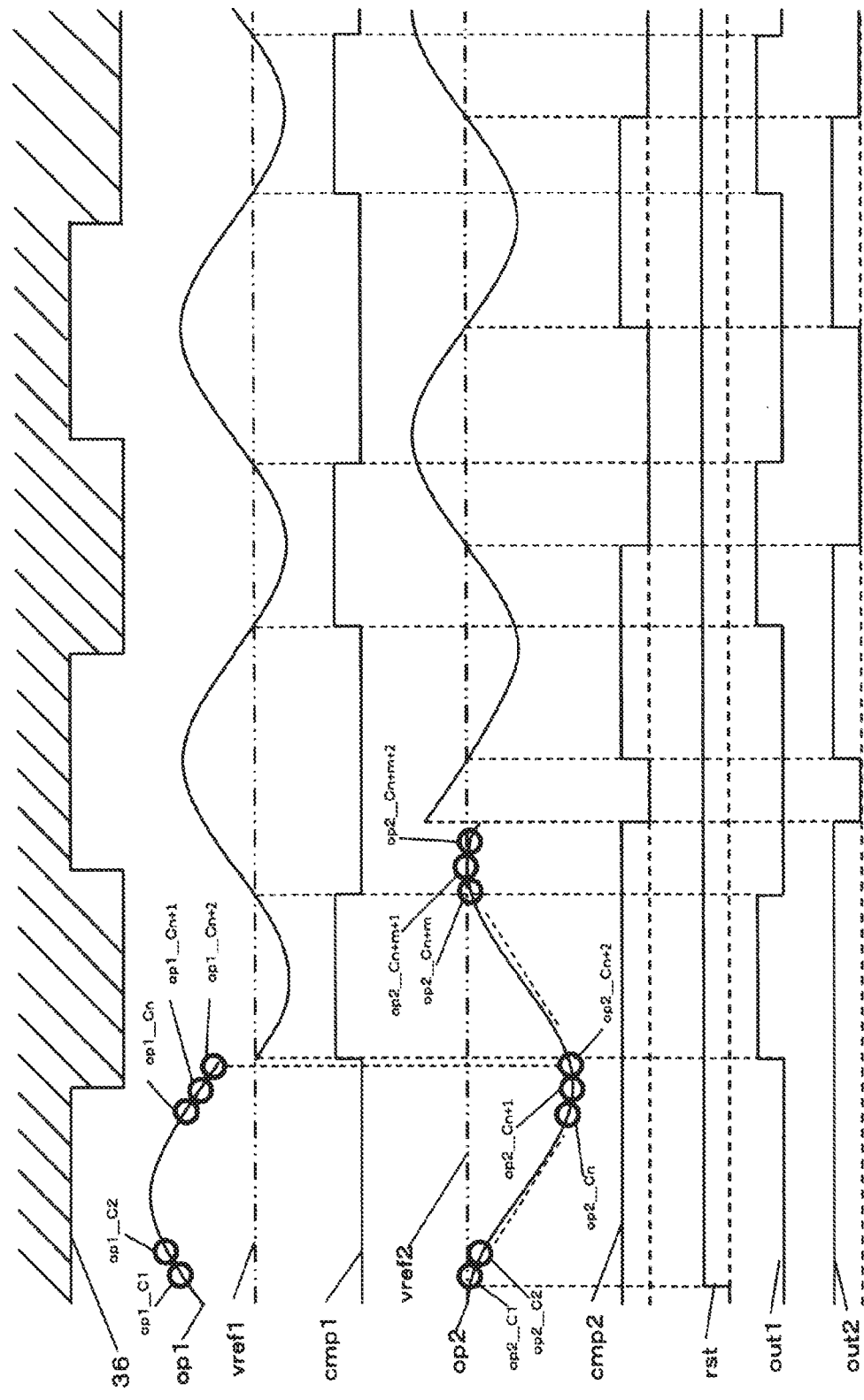
FIG. 4 is a waveform chart for explaining the operation of a magnetic detection apparatus according to Embodiment 1 of the present invention.
Figure 5:
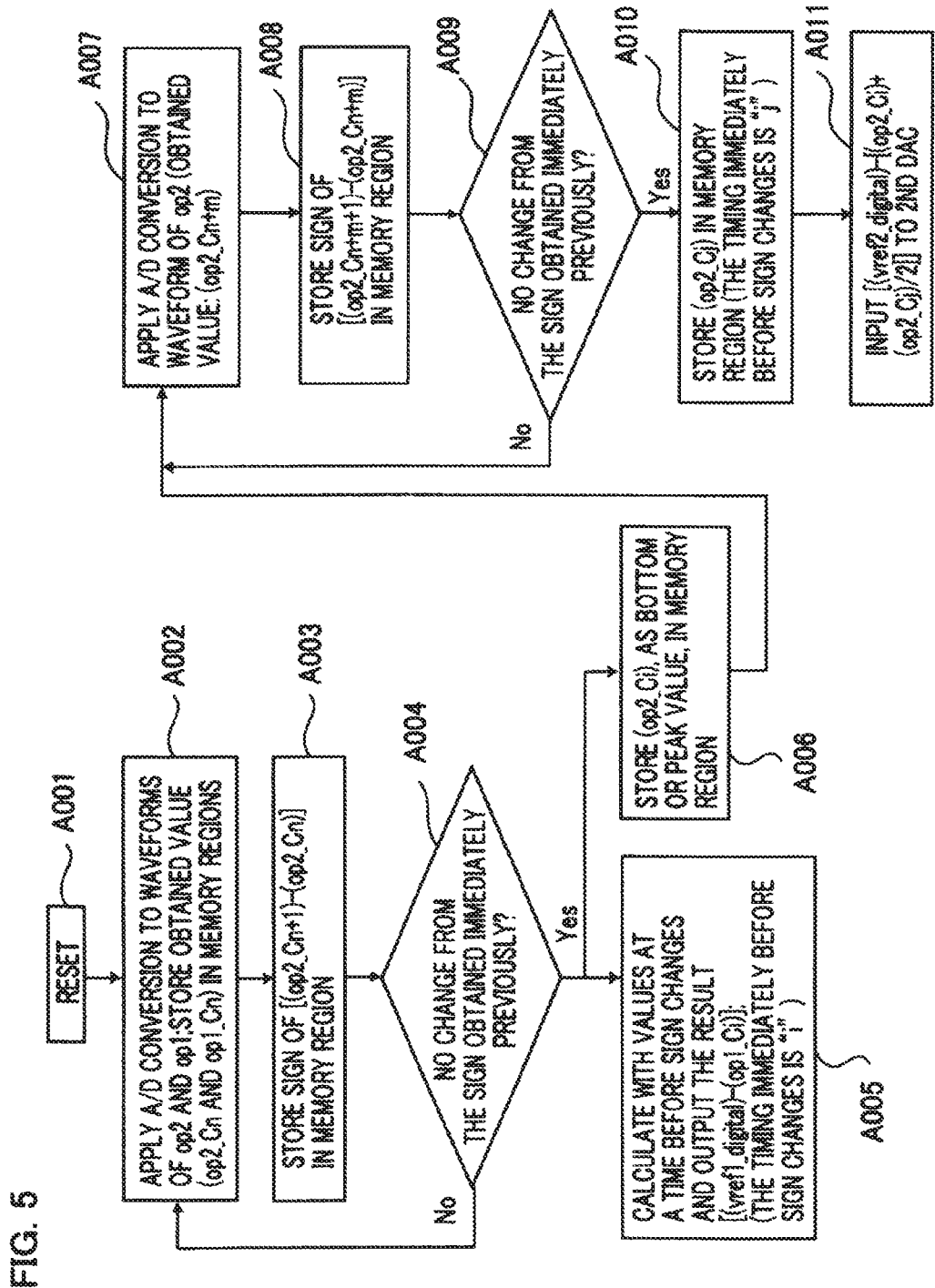
FIG. 5 is a flowchart representing the operation of the magnetic detection apparatus according to Embodiment 1 of the present invention.

FIG. 4 is a waveform chart for explaining the operation of the magnetic detection apparatus according to Embodiment 1 of the present invention; FIG. 5 is a flowchart representing the operation of the magnetic detection apparatus according to Embodiment 1 of the present invention. Because as described above, there exists a phase difference of 90° between the waveform of the first differential amplification signal op1, which is the output of the first differential amplification circuit 3, and the waveform of the second differential amplification signal op2, which is the output of the second differential amplification circuit 4, there is established a relationship in which the peak or bottom position of any one of the foregoing waveforms corresponds to the amplitude center of the other one thereof. In FIG. 4, the first differential amplification signal op1 and the second differential amplification signal op2 are represented by respective sinusoidal waveforms; there exists a phase difference of approximately 90° between the first differential amplification signal op1 and the second differential amplification signal op2.

In FIGS. 1 and 5, in the step A001, the level of a reset signal rst from the reset circuit 13 turns from the low level to the high level; then, in the step A002, the second ADC 10 applies analogue-to-digital conversion to the waveform of the second differential amplification signal op2, and the first ADC 9 applies analogue-to-digital conversion to the waveform of the first differential amplification signal op1; then, these digital values are stored in a memory region in the calculation circuit 11. In FIG. 4, a circle, as the sign representing the conversion operation, is schematically put on the waveform of the second differential amplification signal op2. In the following explanation, the values of the second differential amplification signal op2, obtained by applying analogue-to-digital conversion to the waveform thereof will sequentially be referred to as [op2_C1], [op2_C2], [op2_Cn], and so on.

Next, in the step A003, the calculation circuit 11 calculates[(op2_Cn+1)−(op2_Cn)], by use of the values[op2_Cn] and [op2_Cn+1] of the second differential amplification signal, obtained in the foregoing step. In this situation, the sign information of the calculation result is stored in the memory region inside the calculation circuit 11. In the step A004, the calculation circuit 11 compares the sign information of the present calculation result with sign information that has been stored in a sign information storage region F immediately before the present calculation, and determines whether or not there exists a change in the sign information. In the case where in the step A004, it is determined that there exists no change in the sign information (No), the step A002 is resumed, and the operation from the step A002 to the step A004 is repeated until it is determined that there exists a change in the sign information (Yes). In the example represented in FIG. 4, the sign information of the result of 1st-to-[n+1]th calculation is "minus"; however, the [n+2]th sign information becomes "plus".

When the sign information changes from "minus" to "plus", the calculation circuit 11 compares, in the step A005, the immediately previous value[op1_Cn+1] of the first differential amplification signal with the digital value ([vref1_digital] in FIG. 5) of the first threshold value, which is a reference, and stores the difference therebetween in the first DAC 7. Simultaneously, in the step A006, the value of the second differential amplification signal [op2_Cn+1] is stored, as the bottom or peak value, in the memory region of the calculation circuit 11. As a result, as represented in FIG. 4, at first, the waveform of the first differential amplification signal op1 is situated at a higher potential than the first threshold value vref1 is; however, due to the operation in the step A005, the first threshold value vref1 falls within the amplitude range of the waveform of the first differential amplification signal opt.

Furthermore, in the step A007, the second ADC 10 continues the analogue/digital conversion operation. Then, as is the case with the step A003, in the step A008, the calculation circuit 11 calculates [(op2_Cn+m+1)−(op2_Cn+m)], by use of the values [op2_Cn+m] and [op2_Cn+m+1] of the second differential amplification signal, obtained in the foregoing step; the sign information of the calculation result is stored in the memory region of the calculation circuit 11.

Next, in the step A009, as is the case with the foregoing step A004, it is determined whether or not there exists a change in the obtained sign. In FIG. 4, when the [n+m+2]th sign changes from "plus" to "minus", it is determined that the sigh has changed; then, in the step A010, the value of op2_Cn+m+1] is stored, as "bottom" or "peak", in the memory region of the calculation circuit 11.

Next, in the step A011, the calculation circuit 11 calculates the average value of [op2_Cn+1] and [op2_Cn+m+1] that have already been stored in the memory region of the calculation circuit 11, compares the calculated average value with the digital value ([vref2_digital] in FIG. 5) of the second threshold value, which is the reference, and stores the difference therebetween in the second DAC 8. As a result, as represented in FIG. 4, at the initial time after the reset, the waveform of the second differential amplification signal op2 is situated at a lower potential than the second threshold value vref2 is; however, due to the foregoing series of operational actions, the second threshold value vref2 falls within the amplitude range of the waveform of the second differential amplification signal op2.

In this situation, it is conceivable that when the conversion time of the analogue/digital conversion does not fall within a predetermined period, it is not made possible to make the potentials of the first threshold value vref1 and the second threshold value vref2 fall into the respective amplitude ranges of the first differential amplification signal op1 and the second differential amplification signal op2.

Figure 6:
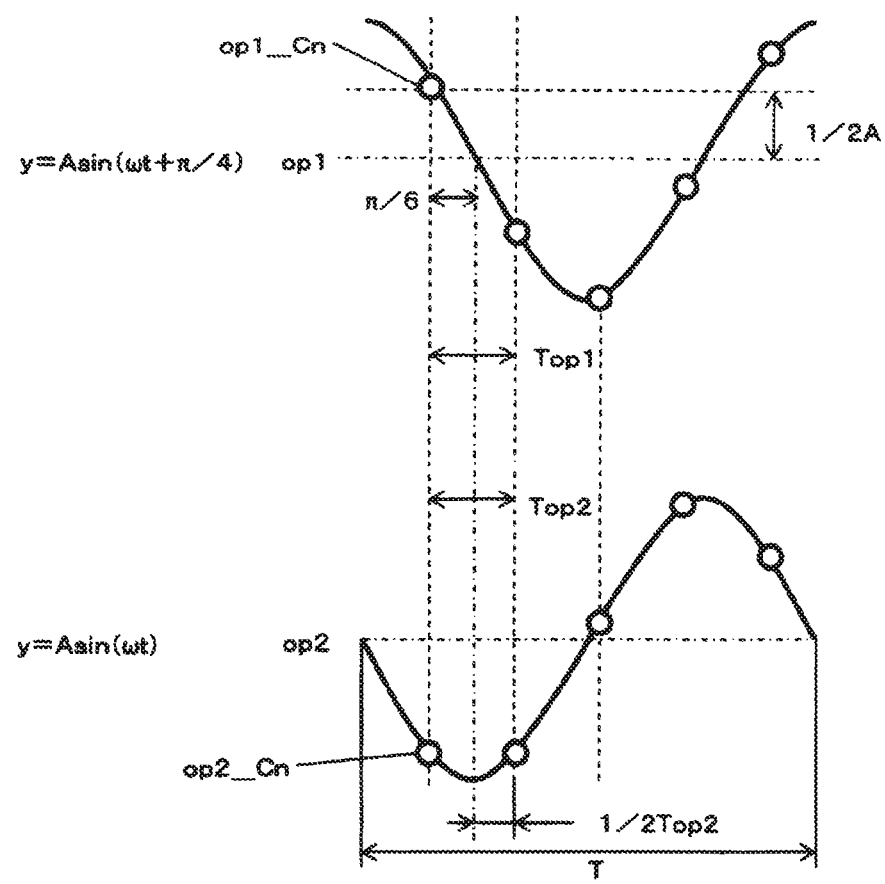
FIG. 6 is a waveform chart for explaining the operation of the magnetic detection apparatus according to Embodiment 1 of the present invention.

FIG. 6 is a waveform chart for explaining the operation of the magnetic detection apparatus according to Embodiment 1 of the present invention. As represented in FIG. 6, it is assumed that, for example, each of the first differential amplification signal op1 and the second differential amplification signal op2 can be approximated with a sinusoidal wave. Letting "A", Top1, Top2, and f denote each of the same half amplitudes (referred to as half amplitudes, hereinafter) of the total amplitudes of the first differential amplification signal op1 and the second differential amplification signal op2, the conversion time of the first ADC 9, the conversion time of the second ADC 10, and each of the same frequencies of the first differential amplification signal op1 and the second differential amplification signal op2; it is assumed that $\omega=2\pi f$. The period T can be expressed as $T=1/f$.

Here, the first differential amplification signal op1 and the second differential amplification signal op2 can be expressed by the following equations (1) and (2), respectively.

$$op1: y = A\sin(\omega t + \pi/4) \quad (1)$$

$$op2: y = A\sin(\omega t) \quad (2)$$

In the case where taking a variation in the circuit into consideration, it is assumed that the deviation from the original peak value or bottom value of the first differential amplification signal op1 to be analogue/digital-converted becomes up to [½] of the half amplitude, the analogue/digital conversion at a time when the value of the first differential amplification signal in FIG. 6 is [op1_Cn] is performed at a time when the first differential amplification signal op1 is [½A]. As represented in FIG. 6, when the period from the time when the value of the first differential amplification signal is [op1_Cn] to the time when the value of first differential amplification signal is at the amplitude center is expressed by a phase, it becomes [π/6]. When it is assumed that the equation [Top1=Top2] is established, the condition under which the conversion time becomes maximum is that the period from the time when the value of the second differential amplification signal is [op2_Cn] to the time when the second differential amplification signal op2 is at the bottom value is [Top2/2]. Accordingly, because the equation [½Top2/T×2π=π/6] is established, it is advisable that the analogue/digital conversion time satisfies the equation (3) below.

$$Top1 = Top2 = T/6 \quad (3)$$

Even when the amplitude ranges of the first differential amplification signal op1 and the second differential amplification signal op2 deviate from the potentials of the first threshold value vref1 and the second threshold value vref2, respectively, the foregoing operation makes it possible to make the potentials of the first threshold value vref1 and the second threshold value vref2 fall into the respective amplitude ranges of the first differential amplification signal op1 and the second differential amplification signal op2. Therefore, in the magnetic detection apparatus according to Embodiment 1 of the present invention, neither the first detection signal out1 nor the second detection signal out2 becomes a fixed value, unlike in the magnetic detection apparatus based on the foregoing technology that is a basis of the present invention.

The foregoing operation of the magnetic detection apparatus according to Embodiment 1 of the present invention may be performed only in a predetermined period after the reset signal rst has been generated (has become high-level). In addition, it may be allowed that after being completed, the foregoing operation is followed by the operation based on the technology that is a basis of the present invention.

In the foregoing magnetic detection apparatus according to Embodiment 1 of the present invention, as the reference potentials to be inputted to the first differential amplification circuit 3 and the second differential amplification circuit 4, the output signals of the first DAC 7 and the second DAC 8, respectively, are inputted thereto; however, even when as the threshold potentials in the first comparison circuit 5 and the second comparison circuit 6, the output signals of the first DAC 7 and the second DAC 8, respectively, are inputted, the same effect can be demonstrated.

Embodiment 2

Next, a magnetic detection apparatus according to Embodiment 2 of the present invention will be explained. In the foregoing magnetic detection apparatus according to Embodiment 1 of the present invention, detection of the peak or the bottom of the waveform of the second differential amplification signal op2 (the steps A004 and A009 in FIG. 5) is performed only by comparing the values at the front and rear portions of the waveform of the second differential amplification signal op2; however, for example, when the frequency of the waveform of the second differential amplification signal op2 is low, the values ([op2_Cn] and [op2_Cn+1]) at the front and rear portions, with respect to the peak or bottom, of the waveform of the second differential amplification signal op2 may become close values, i.e., approximately the same values. As a result, detection of the peak or the bottom to be originally detected may fail. Accordingly, in the magnetic detection apparatus according to Embodiment 2, a hysteresis is provided in determination in the detection of the peak or bottom of the waveform of the second differential amplification signal op2.

Figure 7:
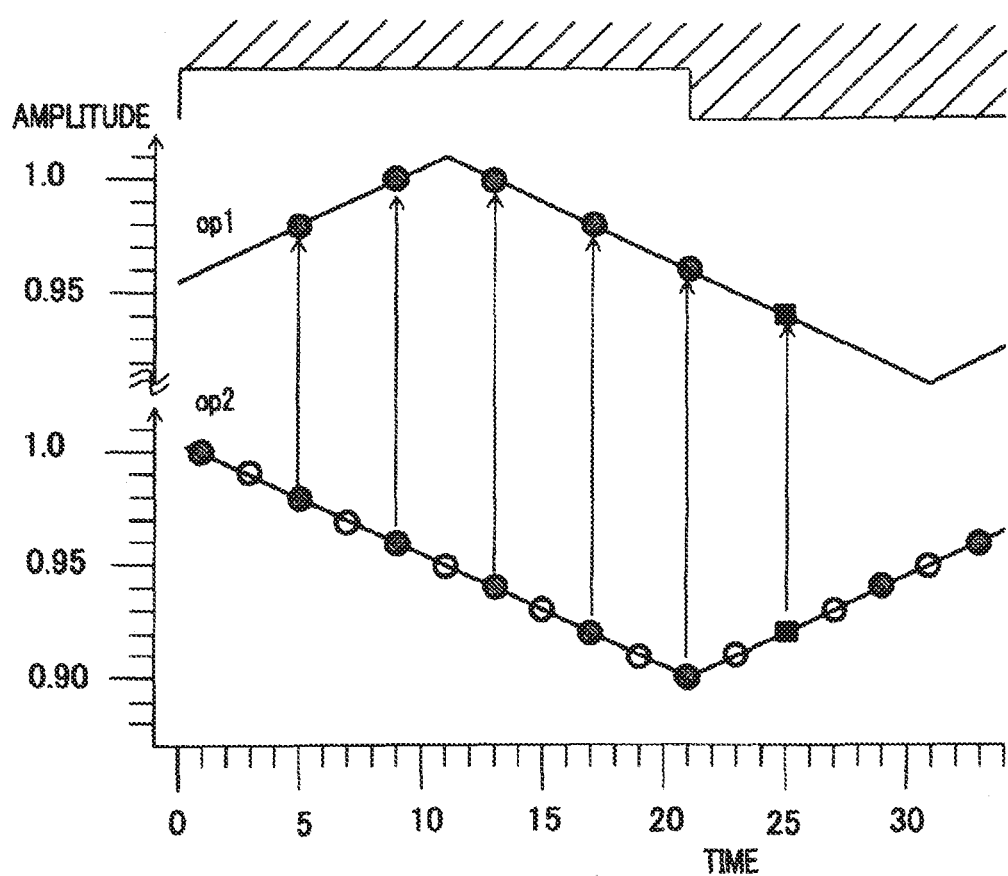
FIG. 7 is a waveform chart for explaining the operation of a magnetic detection apparatus according to Embodiment 2 of the present invention.
Figure 8:
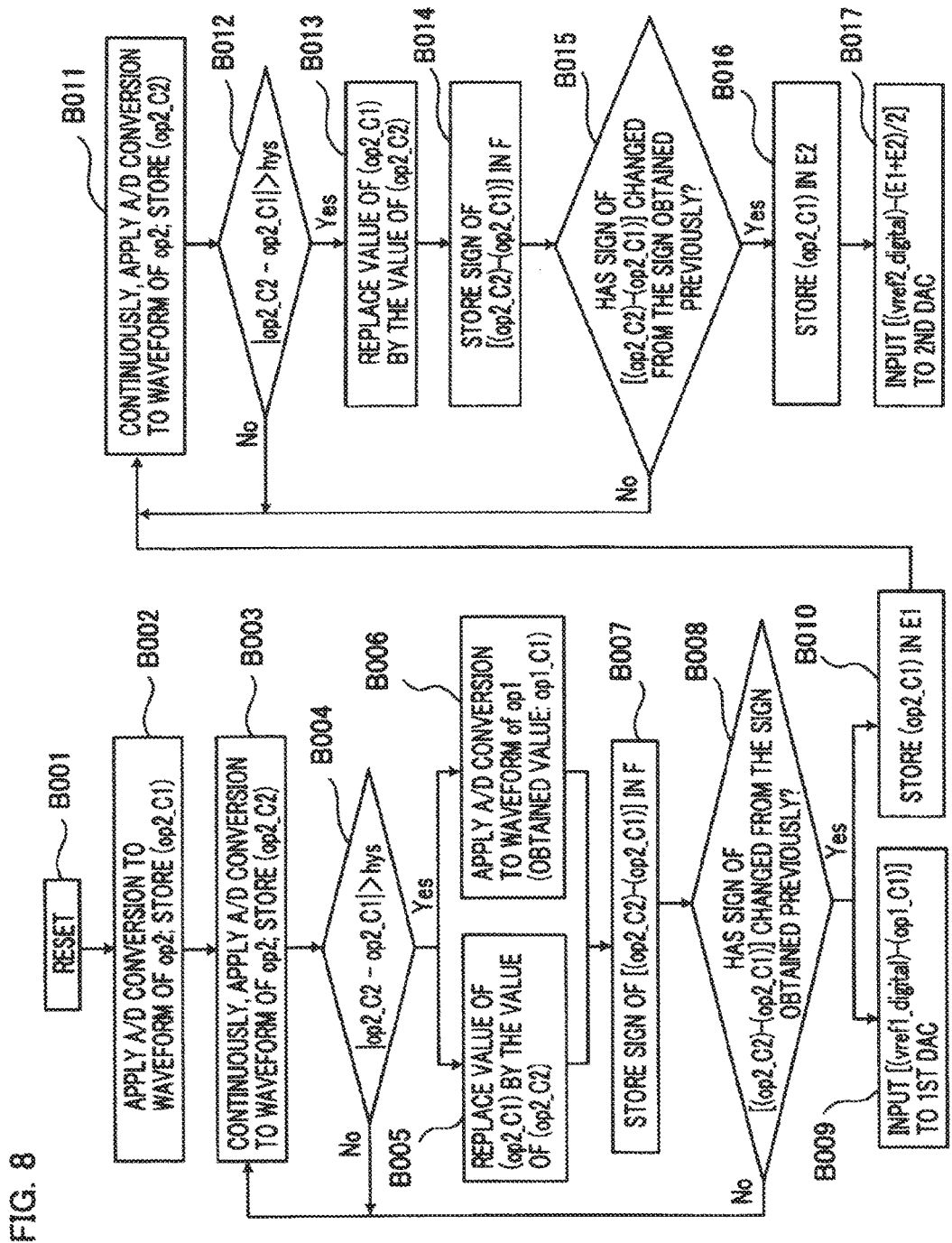
FIG. 8 is a flowchart representing the operation of the magnetic detection apparatus according to Embodiment 2 of the present invention.

FIG. 7 is a waveform chart for explaining the operation of the magnetic detection apparatus according to Embodiment 2 of the present invention. In FIG. 7, for the sake of brief explanation of hysteresis operation, it is assumed that each of the waveforms of the first differential amplification signal op1 and the second differential amplification signal op2 is a triangular wave, and the representation of the waveforms of the signals other than the first differential amplification signal op1 and the second differential amplification signal op2 are omitted. In FIG. 7, the abscissa denotes the time and the ordinate denotes the amplitude, while indicating no specific unit; the time will be referred to as 0 [time], 1 [time], or the like, and the amplitude will be referred to as 1.0 [amplitude], 0.99 [amplitude], or the like. FIG. 8 is a flowchart representing the operation of the magnetic detection apparatus according to Embodiment 2 of the present invention; the flowchart corresponds to the operation represented in FIG. 7. Because the respective configurations of the magnetic circuit and the electric circuit are the same as those in Embodiment 1, the explanations therefor are omitted.

In FIGS. 7 and 8, at first, in the step B001, the reset signal rst becomes high-level at 1 [time]; at the step B002, the second ADC 10 applies analogue/digital conversion to the second differential amplification signal op2 so as to obtain a digital value of [op2_C1=1.0] [amplitude], and then this digital value is stored in the storage region of the calculation circuit 11. Next, at the step B003, also at 3 [time], the second ADC 10 applies analogue/digital conversion to the second differential amplification signal op2 so as to obtain a digital value of [op2_C2=0.99] [amplitude], and then this digital value is stored in the storage region of the calculation circuit 11.

Next, in the step B004, the calculation circuit 11 performs calculation of [|0.99−1.00|] and determines whether or not the result of the calculation is larger than a preliminarily set hysteresis value hys. Here, hys is set to 0.015. In the foregoing calculation, the equation [|0.99−1.00|=0.01] [amplitude] is established; therefore, the calculation result does not exceed the hysteresis value hys (No).

Then, the step B003 is resumed; at 5 [time], the second ADC 10 further applies analogue/digital conversion to the second differential amplification signal op2 so as to obtain and store a digital value of [op2_C2=0.98] [amplitude]. Next, in the step B004, the calculation circuit 11 performs calculation of [|0.98−1.00|] and determines whether or not the result of the calculation is larger than the preliminarily set hysteresis value hys. In the foregoing calculation, the equation [|0.98−1.00|=0.02] [amplitude] is established; therefore, the calculation result exceeds the hysteresis value hys (Yes).

Accordingly, at the step B005, the first differential amplification signal [op1_C1] is replaced by the value of the second differential amplification signal [op2_C2] and becomes [op2_C1=0.98] [amplitude]. Concurrently, at the step B006, the first ADC 9 applies analogue/digital conversion to the first differential amplification signal op1 so as to obtain a digital value of [op1_C1=0.98] [amplitude].

Next, in the step B007, because the sign of [(op2_C2)−(op2_C1)] is minus, this sign information is stored in the sign information storage region F. Next, in the step B008, the calculation circuit 11 determines whether or not the sign information of [0.98−1.0], which is "minus", has changed from the previously obtained sign information. Here, it is assumed that the sign information of [0.98−1.0] has not changed from the previously obtained sign information (No); then, the following explanations will be made. In the case where the sign information has not changed (No), the operation from the step B003 to the step B007 is repeated.

Here, the step B003 is resumed; then, in the step B004, the calculation circuit 11 performs calculation of [|0.92−0.90|] at 25 [time]. In the foregoing calculation, the equation [|0.92−0.90|=0.02] [amplitude] is established; therefore, the calculation result exceeds the hysteresis value hys. Accordingly, in the step B005, the first differential amplification signal [op1_C1] is replaced by the value of the second differential amplification signal [op2_C2] and becomes [op2_C1=0.92] [amplitude]; concurrently, in the step B006, the first ADC 9 applies analogue/digital conversion to the first differential amplification signal op1 so as to obtain a digital value of [op1_C1=0.94] [amplitude].

Next, in the step B008, the calculation circuit 11 determines whether or not the sign of [0.92−0.9] has changed from the previously obtained sign. Here, because the previous sign, which is "minus", has changed to the present sign, which is "plus", [(vref1_digital)−(op1_C1)] (in this case, [op1_C1=0.94] [amplitude]) is inputted to the first DAC 7 in the step B009. In the step B010, the value of the second differential amplification signal [op2_C1] is set to E1 (=0.92 [amplitude]). Also after the step B010, the second ADC 10 applies analogue/digital conversion to the waveform of the second differential amplification signal op2 and repeats the same operation. In the step B016, a value of [E2=0.98] [amplitude] is obtained; the calculation circuit 11 performs calculation of [(vref2_digital)−{E1+E2}/2]; the calculation result is inputted to the second DAC 8 in the step B017.

In the foregoing magnetic detection apparatus according to Embodiment 2 of the present invention, the above-mentioned operation makes it possible to securely detect the peak or the bottom of the second differential amplification signal op2 even when the frequency of the waveform of the second differential amplification signal op2 is low.

Embodiment 3

Figure 9:
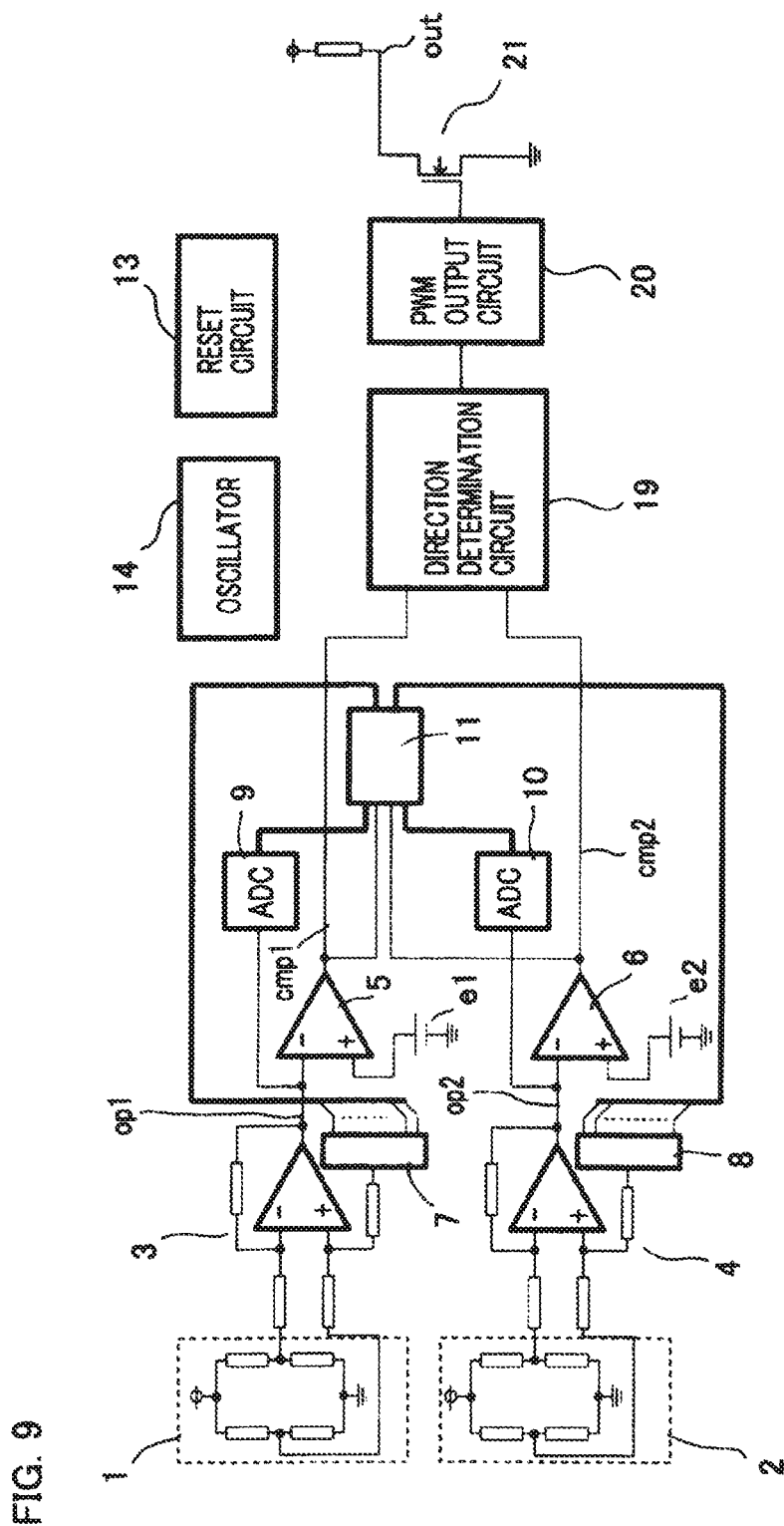
FIG. 9 is a circuit configuration diagram of a magnetic detection apparatus according to Embodiment 3 of the present invention.

A magnetic detection apparatus according to Embodiment 3 of the present invention outputs a detection signal, based on PWM (Pulse Width Modulation). As described above, a magnetic detection apparatus itself that outputs a detection signal, based on PWM, is disclosed in Patent Document 2. FIG. 9 is a circuit configuration diagram of the magnetic detection apparatus according to Embodiment 3 of the present invention.

In FIG. 9, the first comparison signal cmp1 from the first comparison circuit 5 and the second comparison signal cmp2 from the second comparison circuit 6 are inputted to a direction determination circuit 19. The output of the direction determination circuit 19 is connected with a PWM output circuit 20 and is eventually connected with an output switching device 21 formed of a transistor. The other configurations are the same as those in Embodiment 1 illustrated in FIG. 1.

FIG. 10 is a waveform chart for explaining the operation of the magnetic detection apparatus according to Embodiment 3 of the present invention. In FIGS. 9 and 10, whether the traveling direction of the magnetic moving body 36 is forward or backward, the first differential amplification signal op1 has the same waveform; however, when the traveling direction is reversed, the phase of the waveform of the second differential amplification signal op2 is reversed by 180°. Thus, the direction determination circuit 19 determines the traveling direction of the magnetic moving body 36, based on the phase relationship between the first comparison signal cmp1 from the first comparison circuit 5 and the second comparison signal cmp2 from the second comparison circuit 6. For example, when the first comparison signal cmp1 is high-level at a falling edge of the second comparison signal cmp2, the direction determination circuit 19 determines that the magnetic moving body 36 is rotating forward, and when the first comparison signal cmp1 is low-level at a falling edge of the second comparison signal cmp2, the direction determination circuit 19 determines that the magnetic moving body 36 is rotating backward. FIG. 10 indicates that the magnetic moving body 36 is rotating forward.

As represented in FIG. 10, the output of the switching device 21 is given in synchronization with the falling timing of the second comparison signal cmp2 and in such a way as to have a predetermined pulse width corresponding to the traveling direction of the magnetic moving body 36. For example, it is assumed that the pulse width for the forward-rotation travel is tf and that the pulse width for the backward-rotation travel is tr. Accordingly, based on the width difference between the pulse width tf and the pulse width tr, the traveling direction of the magnetic moving body 36 can be indicated.

In this situation, in the series of operational actions of the foregoing magnetic detection apparatus, according to any one of Embodiments 1 and 2, in which the first threshold value vref1 and the second threshold value vref2 are made to fall within the amplitude ranges of the waveforms of the first differential amplification signal op1 and the second differential amplification signal op2, respectively, there may be caused a case where even when the traveling direction of the magnetic moving body 36 is unique, the first comparison signal cmp1 and the second comparison signal cmp2 do not correspond to the foregoing determination logic for the traveling direction. The situation at a time t1 in FIG. 10 corresponds to that case.

That is to say, because at the time t1, the first comparison signal cmp1 is low-level at the falling edge of the second comparison signal cmp2, the direction determination logic indicates the backward rotation. However, in fact, the magnetic moving body 36 is rotating forward. Because being caused by shifting the waveform of the second differential amplification signal op2 upward, the falling edge should not be utilized in the rotation-direction logic.

Figure 11A:
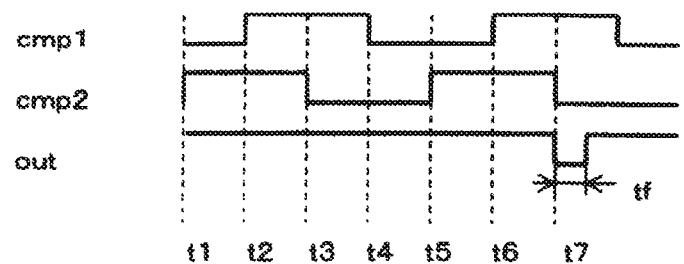
FIG. 11A is a waveform chart for explaining the operation of the magnetic detection apparatus according to Embodiment 3 of the present invention.
Figure 11B:
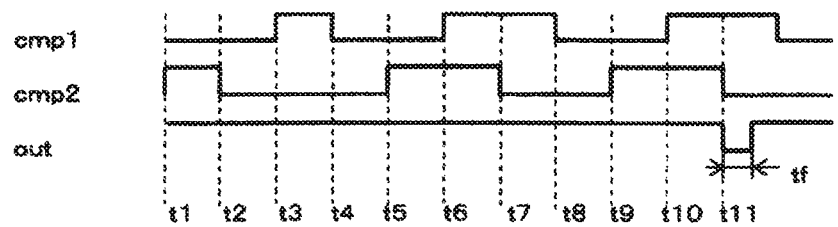
FIG. 11B is a waveform chart for explaining the operation of the magnetic detection apparatus according to Embodiment 3 of the present invention.

Accordingly, in the magnetic detection apparatus according to Embodiment 3 of the present invention, as the operation after the reset signal rst has risen, an output pulse, as the detection signal, is outputted after it has been confirmed that the rising edge or the falling edge of the first comparison signal cmp1 and the falling edge or the rising edge of the second comparison signal cmp2, as the case may be, alternately appeared. Each of FIGS. 11A and 11B is a waveform chart for explaining the operation of the magnetic detection apparatus according to Embodiment 3 of the present invention. In each of FIGS. 11A and 11B, the waveforms of only the first comparison signal cmp1, the second comparison signal cmp2, and the detection signal out are represented, for the sake of simplicity. There are represented each of the waveforms at a time immediately after the reset signal rst has risen.

In FIG. 11A, at the time t1, the second comparison signal cmp2 is at its rising edge; at a time t2, the first comparison signal cmp1 rises; at a time t3, the second comparison signal cmp2 is at its falling edge; at a time t4, the first comparison signal cmp1 is at its falling edge. The PWM output circuit 20 determines that the rising edge or the falling edge of the first comparison signal cmp1 and the falling edge or the rising edge of the second comparison signal cmp2, as the case may be, have alternately appeared and then outputs the detection signal out at a time t7.

In FIG. 11B, at the time t1, the second comparison signal cmp2 is at its rising edge; at the time t2, the second comparison signal cmp2 is at its falling edge. In this situation, the PWM output circuit 20 cannot determine that the rising edge or the falling edge of the first comparison signal cmp1 and the falling edge or the rising edge of the second comparison signal cmp2, as the case may be, have alternately appeared. However, in the operation from the time t5 to a time t8, the PWM output circuit 20 can determine that the rising edge or the falling edge of the first comparison signal cmp1 and the falling edge or the rising edge of the second comparison signal cmp2, as the case may be, have alternately appeared and then outputs the detection signal out at a time t11.

A series of operational actions in Embodiment 3 of the present invention is the same as the series of operational actions of the foregoing magnetic detection apparatus, according to any one of Embodiments 1 and 2, in which the first threshold value vref1 and the second threshold value vref2 are made to fall within the amplitude ranges of the waveforms of the first differential amplification signal op1 and the second differential amplification signal op2, respectively; however, in the foregoing magnetic detection apparatus according to Embodiment 3 of the present invention, because after it is determined that the rising edge or the falling edge of the first comparison signal cmp1 and the falling edge or the rising edge of the second comparison signal cmp2, as the case may be, have alternately appeared, the detection signal out is outputted, no erroneous output with regard to the result of determination on the traveling direction of the magnetic moving body 36 is given.

Embodiment 4

In the foregoing magnetic detection apparatus according to Embodiment 3, the traveling direction can be indicated by changing the pulse width in accordance with the traveling direction of the magnetic moving body 36; however, in a magnetic detection apparatus according to Embodiment 4 of the present invention, the traveling direction is indicated by changing the potential of the pulse of the detection signal.

Figure 12:
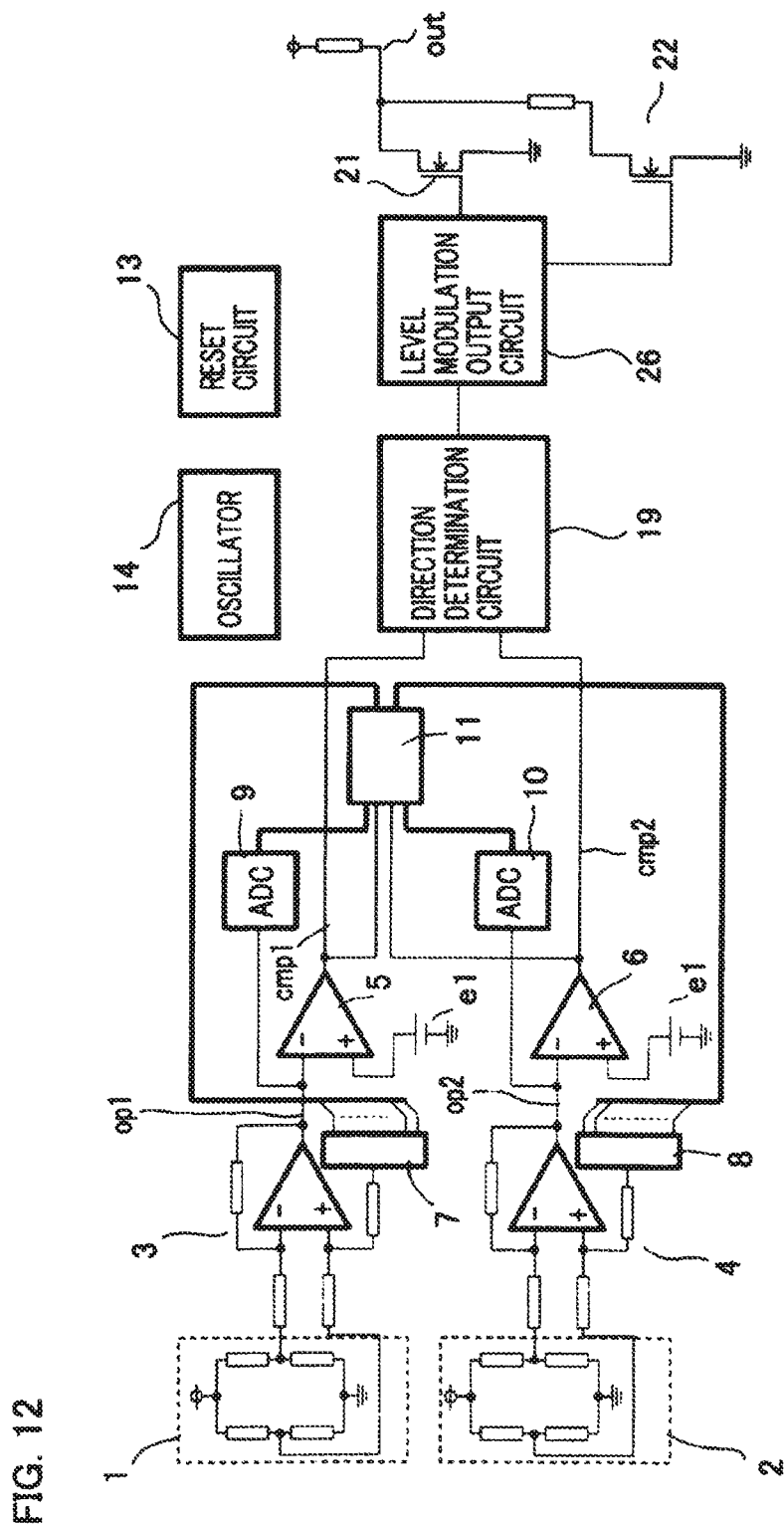
FIG. 12 is a circuit configuration diagram of a magnetic detection apparatus according to Embodiment 4 of the present invention.

FIG. 12 is a circuit configuration diagram of the magnetic detection apparatus according to Embodiment 4 of the present invention. The difference between the magnetic detection apparatus according to Embodiment 4 and the foregoing magnetic detection apparatus according to Embodiment 3 is that a level modulation output circuit 26 is connected with the output of the direction determination circuit 19 and that there are provided the switching device 21, formed of a transistor, that is driven by the output of the level modulation output circuit 26 and a low-level switching device 22 formed of a transistor.

Figure 13A:
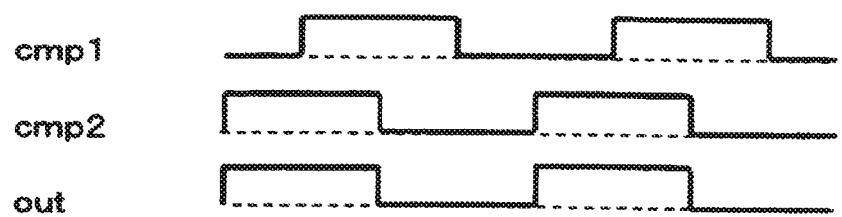
FIG. 13A is a waveform chart for explaining the operation of the magnetic detection apparatus according to Embodiment 4 of the present invention.
Figure 13B:
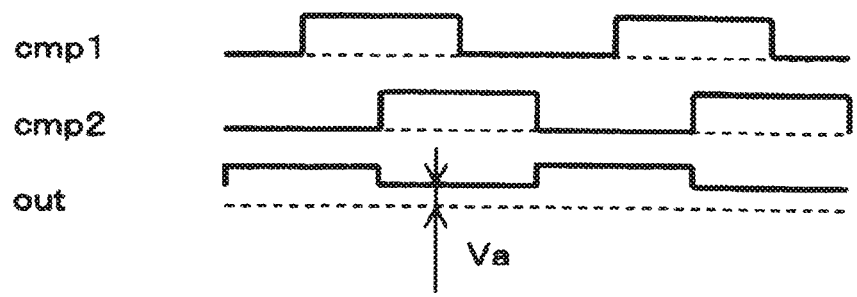
FIG. 13B is a waveform chart for explaining the operation of the magnetic detection apparatus according to Embodiment 4 of the present invention.
Figure 13C:
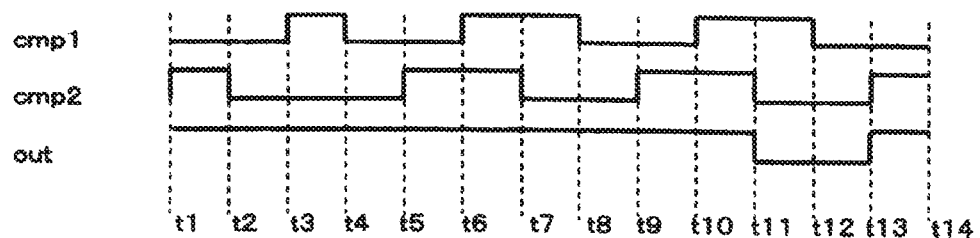
FIG. 13C is a waveform chart for explaining the operation of the magnetic detection apparatus according to Embodiment 4 of the present invention.

Each of FIGS. 13A, 13B, and 13C is a waveform chart for explaining the operation of the magnetic detection apparatus according to Embodiment 4 of the present invention. In each of FIGS. 13A, 13B, and 13C, the waveforms of only the first comparison signal cmp1, the second comparison signal cmp2, and the detection signal out are represented, for the sake of simplicity. There are represented each of the waveforms at a time immediately after the reset signal rst has risen.

FIGS. 13A and 13B indicate the differences in operation waveforms, which are caused by the difference in the traveling direction of the magnetic moving body 36. For example, when it is assumed that FIG. 13A represents the waveforms at a time when the magnetic moving body 36 rotates forward, FIG. 13B represents the waveforms at a time when the magnetic moving body 36 rotates backward. In the case of the forward-rotation travel of the magnetic moving body 36, the waveform of the detection signal out is outputted in synchronization with the second comparison signal cmp2. In the case of the backward-rotation travel of the magnetic moving body 36, the detection signal out is in synchronization with the second comparison signal cmp2; however, the low-level value of the waveform of the detection signal out rises up to Va.

In FIG. 13C, as is the case with the foregoing magnetic detection apparatus according to Embodiment 3, after the level modulation output circuit 26 determines that the rising edge or the falling edge of the first comparison signal cmp1 and the falling edge or the rising edge of the second comparison signal cmp2, as the case may be, have alternately appeared, the detection signal out is outputted.

A series of operational actions in Embodiment 4 of the present invention is the same as the series of operational actions, in any one of Embodiments 1 and 2, in which the first threshold value vref1 and the second threshold value vref2 are made to fall within the amplitude ranges of the waveforms of the first differential amplification signal op1 and the second differential amplification signal op2, respectively; however, because after it is determined that the rising edge or the falling edge of the first comparison signal cmp1 and the falling edge or the rising edge of the second comparison signal cmp2, as the case may be, have alternately appeared, the detection signal out is outputted, no erroneous output with regard to the result of determination on the traveling direction of the magnetic moving body 36 is given.

Embodiment 5

Figure 14:
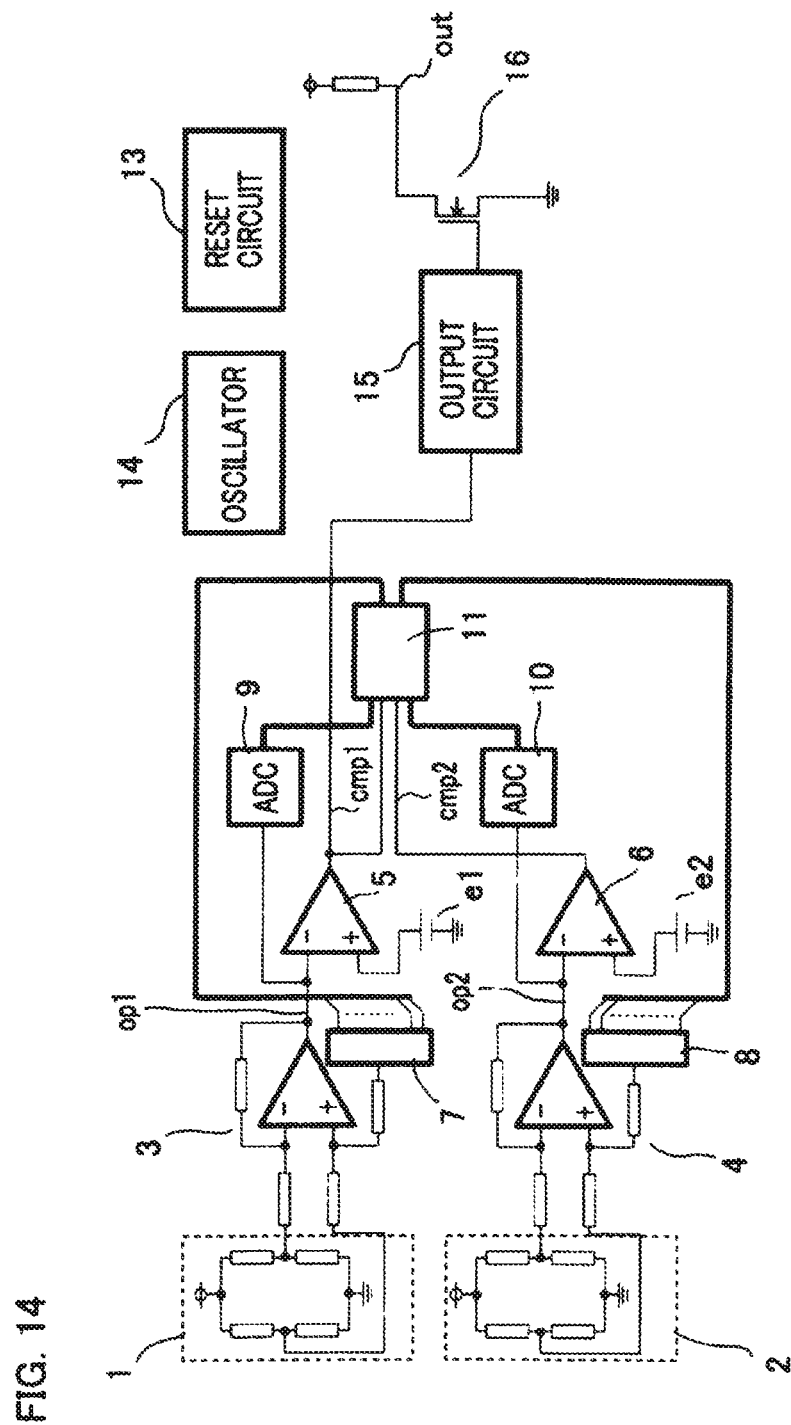
FIG. 14 is a circuit configuration diagram of a magnetic detection apparatus according to Embodiment 5 of the present invention.

FIG. 14 is a circuit configuration diagram of a magnetic detection apparatus according to Embodiment 5 of the present invention. The magnetic detection apparatus according to Embodiment 5 differs from the magnetic detection apparatus according to Embodiment 1 in that the second output circuit 17 and the second switching device 18 in Embodiment 1 are removed; in Embodiment 5, only the output circuit 15 and the switching device 16 are provided.

Figure 15:
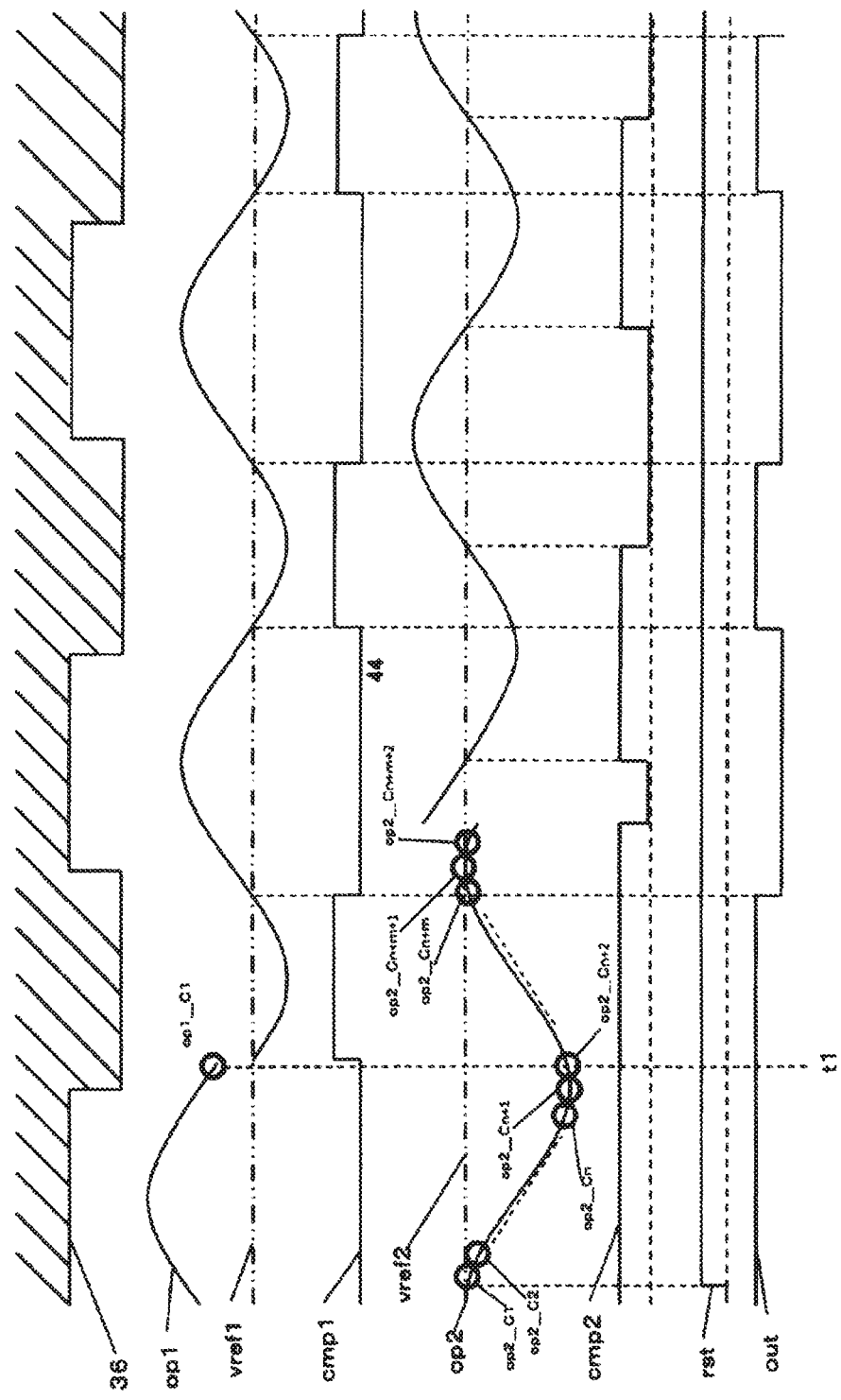
FIG. 15 is an operation waveform chart of the magnetic detection apparatus according to Embodiment 5 of the present invention.

FIG. 15 is an operation waveform chart of the magnetic detection apparatus according to Embodiment 5 of the present invention. The operational actions of the first differential amplification signal op1, the second differential amplification signal op2, the first comparison signal cmp1, and the second comparison signal cmp2 are the same as those in each of foregoing Embodiments 1 and 2.

In FIGS. 14 and 15, the output circuit 15 starts to output the detection signal out at the first falling edge of the first comparison signal cmp1 after the reset signal rst has risen. It may be allowed that the output circuit 15 starts to output the detection signal out at the first rising edge of the first comparison signal cmp1. It may also be allowed that the output circuit 15 starts to output the detection signal out at the Nth (N: a natural number) rising edge or falling edge of the first comparison signal cmp1.

A series of operational actions in Embodiment 5 is the same as the foregoing series of operational actions, in each of Embodiments 1 and 2, in which the first threshold value vref1 and the second threshold value vref2 are made to fall within the amplitude ranges of the waveforms of the first differential amplification signal op1 and the second differential amplification signal op2, respectively; however, because after the series of operational actions is completed, the output circuit 15 can start to output the detection signal out at a desired edge of the first comparison signal cmp1, the output circuit 15 can be prevented from outputting the detection signal out, based on an erroneous output, of the first comparison circuit 5, that may be generated by the foregoing series of operational actions.

Each of the foregoing magnetic detection apparatuses according to Embodiments 1 through 5 of the present invention is the one in which at least any one of the following inventions is put into practice.

(1) A magnetic detection apparatus comprising:
a first group of magnetoelectric conversion elements that is disposed in such a way as to face a magnetic moving body and that converts a change in a magnetic field, caused by a travel of the magnetic moving body, into a change in an electric quantity;
a second group of magnetoelectric conversion elements that is disposed at a position, in a traveling direction of the magnetic moving body, different from the position where the first group of magnetoelectric conversion elements is disposed and that converts a change in a magnetic field, caused by a travel of the magnetic moving body, into a change in an electric quantity;
a first comparison circuit that generates a binarized, first comparison signal, based on comparison between a first threshold value and a first output signal based on conversion into the electric quantity by the first group of magnetoelectric conversion elements;
a second comparison circuit that generates a binarized, second comparison signal, based on comparison between a second threshold value and a second output signal based on conversion into the electric quantity by the second group of magnetoelectric conversion elements;
a first threshold value adjusting apparatus that can adjust the first threshold value;
a second threshold value adjusting apparatus that can adjust the second threshold value;
a first analogue/digital conversion circuit that converts the first output signal into a digital value; and
a second analogue/digital conversion circuit that converts the second output signal into a digital value,
wherein it is made possible to implement at least one of actions (1) and (2) below:
(1) the second analogue/digital conversion circuit converts the second output signal into a digital value at a time when the peak value or the bottom value of the first output signal is detected, and then the second threshold value adjusting apparatus adjusts the second threshold value, based on comparison between a predetermined reference value and said digital value obtained through the conversion; and
(2) the first analogue/digital conversion circuit converts the first output signal into a digital value at a time when the peak value or the bottom value of the second output signal is detected, and then the first threshold value adjusting apparatus adjusts the first threshold value, based on comparison between a predetermined reference value and said digital value obtained through the conversion.

(2) The magnetic detection apparatus according to (1) wherein there exists a phase difference between the first output signal and the second output signal in such a way that at a time when any one of the first output signal and the second output signal is at the peak or the bottom value thereof, the other one of the first output signal and the second output signal is at the amplitude center thereof.

(3) A magnetic detection apparatus comprising:
a first group of magnetoelectric conversion elements that is disposed in such a way as to face a magnetic moving body and that converts a change in a magnetic field, caused by a travel of the magnetic moving body, into a change in an electric quantity;

a second group of magnetoelectric conversion elements that is disposed at a position, in a traveling direction of the magnetic moving body, different from the position where the first group of magnetoelectric conversion elements is disposed and that converts a change in a magnetic field, caused by a travel of the magnetic moving body, into a change in an electric quantity;

a first amplification circuit that amplifies, based on a first reference potential, a first output signal based on conversion into the electric quantity by the first group of magnetoelectric conversion elements and then outputs a first amplification signal;

a second amplification circuit that amplifies, based on a second reference potential, a second output signal based on conversion into the electric quantity by the second group of magnetoelectric conversion elements and then outputs a second amplification signal;

a first comparison circuit that compares the first amplification signal with a first threshold value and then outputs a binarized, first comparison signal;

a second comparison circuit that compares the second amplification signal with a second threshold value and then outputs a binarized, second comparison signal;

a first reference potential adjusting apparatus that can adjust the first reference potential in the first amplification circuit;

a second reference potential adjusting apparatus that can adjust the second reference potential in the second amplification circuit;

a first analogue/digital conversion circuit that converts the first amplification signal into a digital value; and a second analogue/digital conversion circuit that converts the second amplification signal into a digital value, wherein it is made possible to implement at least one of actions (1) and (2) below:

(1) the second analogue/digital conversion circuit converts the second amplification signal into a digital value at a time when the peak value or the bottom value of the first output signal is detected, and then the second reference potential adjusting apparatus adjusts the second reference potential, based on comparison between a predetermined reference value and said digital value obtained through the conversion; and (2) the first analogue/digital conversion circuit converts the first output signal into a digital value at a time when the peak value or the bottom value of the second output signal is detected, and then the first reference potential adjusting apparatus adjusts the first reference potential, based on comparison between a predetermined reference value and said digital value obtained through the conversion.

(4) The magnetic detection apparatus according to (3) wherein there exists a phase difference between the first amplification signal and the second amplification signal in such a way that at a time when any one of the first amplification signal and the second amplification signal is at the peak or the bottom value thereof, the other one of the first amplification signal and the second amplification signal is at the amplitude center thereof.

(5) The magnetic detection apparatus according to any one of (3) and (4), wherein based on a clock from an oscillator, the first analogue/digital conversion circuit converts the first amplification signal into two or more digital values at different times, and it is determined that the first amplification signal is at the peak value or the bottom value thereof, based on an increase or a decrease between said two or more digital values obtained through the conversion.

(6) The magnetic detection apparatus according to (5) wherein a predetermined hysteresis is provided in the determination on an increase or a decrease between said two or more digital values.

(7) The magnetic detection apparatus according to any one of (3) through (6), wherein based on the respective digital values of the peak value and the bottom value of the first amplification signal or the second amplification signal, the first reference potential adjusting apparatus or the second reference potential adjusting apparatus adjusts the first reference potential or the second reference potential.

(8) The magnetic detection apparatus according to (7), wherein the first reference potential adjusting apparatus or the second reference potential adjusting apparatus adjusts the first reference potential or the second reference potential, based on comparison between a predetermined reference value and the average value of the respective digital values of the peak value and the bottom value.

(9) The magnetic detection apparatus according to any one of (1) through (8), further including:

a direction determination circuit that determines a traveling direction of the magnetic moving body, based on the first comparison signal and the second comparison signal, and an output circuit that outputs a rectangular wave that is in synchronization with the first comparison signal or the second comparison signal and whose time width differs depending on the traveling direction, wherein at a time when after initialization by a reset circuit, the rising time or the falling time of the first comparison signal and the falling time or the rising time of the second comparison signal, as the case may be, alternately appear, the output circuit starts outputting.

(10) The magnetic detection apparatus according to any one of (1) through (8), further including:

a direction determination circuit that determines a traveling direction of the magnetic moving body, based on the first comparison signal and the second comparison signal, and an output circuit that outputs a rectangular wave that is in synchronization with the first comparison signal or the second comparison signal and whose voltage value differs depending on the traveling direction, wherein at a time when after initialization by a reset circuit, the rising time or the falling time of the first comparison signal and the falling time or the rising time of the second comparison signal, as the case may be, alternately appear, the output circuit starts outputting.

(11) The magnetic detection apparatus according to any one of (1) through (8), further including an output circuit that outputs a rectangular wave, in synchronization with the first comparison signal and the second comparison signal, wherein after initialization by the reset circuit, the output circuit starts outputting at a predetermined falling time or rising time of the first comparison signal or the second comparison signal.

(12) The magnetic detection apparatus according to any one of (1) through (11), wherein operation is performed only in a predetermined period after initialization by a reset circuit.

(13) The magnetic detection apparatus according to any one of (1) through (12), wherein in the case where when Top1, Top2, and T denote a conversion time in which the first analogue/digital conversion circuit converts an analogue signal into a digital signal, a conversion time in which the second analogue/ digital conversion circuit converts an analogue signal into a digital signal, and a changing period of a magnetic field for one-period travel of the magnetic moving body, respectively, the equation "Top1=Top2" is established, the relationship "Top1=Top2=T/6" is satisfied.

INDUSTRIAL APPLICABILITY

The present invention can be applied, for example, to a control apparatus that is mounted in an automobile or the like and detects the rotation position of the engine so as to determine the injection timing and the ignition timing of the fuel.

DESCRIPTION OF REFERENCE NUMERALS

1: 1st bridge circuit
2: 2nd bridge circuit
3: 1st differential amplification circuit
4: 2nd differential amplification circuit
5: 1st comparison circuit
6: 2nd comparison circuit
7: 1st DAC
8: 2nd DAC
9: 1st ADC
10: 2nd ADC
11: calculation circuit
13: reset circuit
14: oscillator
15: 1st output circuit
16: 1st switching device
17: 2nd output circuit
18: 2nd switching device
19: direction determination circuit
20: PWM output circuit
21: switching device
22: low-level switching device
23: AD comparison circuit
24: AD DAC
25: AD calculation circuit
26: level modulation output circuit
31: magnet
32: substrate
33: magnetoelectric conversion elements
33a: 1st group of magnetoelectric conversion elements
33b: 2nd group of magnetoelectric conversion elements
34: outer circumference of magnetic moving body
35: rotation axis
36: magnetic moving body
op1: 1st differential amplification signal
op2: 2nd differential amplification signal
cmp1: 1st comparison signal
cmp2: 2nd comparison signal
vref1: 1st threshold value
vref2: 2nd threshold value
out1: 1st detection signal
Out2: 2nd detection signal
e1: 1st threshold-value power source
e2: 2nd threshold-value power source
rst: reset signal
hys: hysteresis value
out: detection signal

The invention claimed is:

1. A magnetic detection apparatus comprising:
a first group of magnetoelectric conversion elements that is disposed in such a way as to face a magnetic moving body and that converts a change in a magnetic field, caused by a travel of the magnetic moving body, into a change in an electric quantity;
a second group of magnetoelectric conversion elements that is disposed at a position, in a traveling direction of the magnetic moving body, different from the position where the first group of magnetoelectric conversion elements is disposed and that converts a change in a magnetic field, caused by a travel of the magnetic moving body, into a change in an electric quantity;
a first comparison circuit that generates a binarized, first comparison signal, based on comparison between a first threshold value and a first output signal based on conversion into the electric quantity by the first group of magnetoelectric conversion elements;
a second comparison circuit that generates a binarized, second comparison signal, based on comparison between a second threshold value and a second output signal based on conversion into the electric quantity by the second group of magnetoelectric conversion elements;
a first threshold value adjusting apparatus that can adjust the first threshold value;
a second threshold value adjusting apparatus that can adjust the second threshold value;
a first analogue/digital conversion circuit that converts the first output signal into a digital value; and
a second analogue/digital conversion circuit that converts the second output signal into a digital value,
wherein at least one of the following is implemented:
(1) the second analogue/digital conversion circuit converts the second output signal into a digital value at a time when the peak value or the bottom value of the first output signal is detected, and then the second threshold value adjusting apparatus adjusts the second threshold value, based on comparison between a predetermined reference value and said digital value obtained through the conversion; and
(2) the first analogue/digital conversion circuit converts the first output signal into a digital value at a time when the peak value or the bottom value of the second output signal is detected, and then the first threshold value adjusting apparatus adjusts the first threshold value, based on comparison between a predetermined reference value and said digital value obtained through the conversion.

2. The magnetic detection apparatus according to claim 1, wherein there exists a phase difference between the first output signal and the second output signal in such a way that at a time when any one of the first output signal and the second output signal is at the peak or the bottom value thereof, the other one of the first output signal and the second output signal is at the amplitude center thereof.

3. The magnetic detection apparatus according to claim 1, further including:
a direction determination circuit that determines a traveling direction of the magnetic moving body, based on the first comparison signal and the second comparison signal; and
an output circuit that outputs a rectangular wave that is in synchronization with the first comparison signal or the second comparison signal and whose time width differs depending on the traveling direction,
wherein at a time when after initialization by a reset circuit, the rising time and the falling time of the first comparison signal and the falling time and the rising time of the second comparison signal, as the case may be, alternately appear, the output circuit starts outputting.

4. The magnetic detection apparatus according to claim 1, further including:
a direction determination circuit that determines a traveling direction of the magnetic moving body, based on the first comparison signal and the second comparison signal, and
an output circuit that outputs a rectangular wave that is in synchronization with the first comparison signal or the second comparison signal and whose voltage value differs depending on the traveling direction,
wherein at a time when after initialization by a reset circuit, the rising time and the falling time of the first comparison signal and the falling time and the rising time of the second comparison signal, as the case may be, alternately appear, the output circuit starts outputting.

5. The magnetic detection apparatus according to claim 4, further including an output circuit that outputs a rectangular wave, in synchronization with the first comparison signal and the second comparison signal,
wherein after initialization by a reset circuit, the output circuit starts outputting at a predetermined falling time or rising time of the first comparison signal or the second comparison signal.

6. The magnetic detection apparatus according to claim 1, wherein an operation of the second analogue/digital conversion circuit or the first analogue/digital conversion circuit is performed only in a predetermined period after initialization by a reset circuit.

7. The magnetic detection apparatus according to claim 1, wherein in the case where when Top1, Top2, and T denote a conversion time in which the first analogue/digital conversion circuit converts an analogue signal into a digital signal, a conversion time in which the second analogue/digital conversion circuit converts an analogue signal into a digital signal, and a changing period of a magnetic field for one-period travel of the magnetic moving body, respectively, the equation "Top1=Top2" is established, the relationship "Top1=Top2=T/6" is satisfied.

8. A magnetic detection apparatus comprising:
a first group of magnetoelectric conversion elements that is disposed in such a way as to face a magnetic moving body and that converts a change in a magnetic field, caused by a travel of the magnetic moving body, into a change in an electric quantity;
a second group of magnetoelectric conversion elements that is disposed at a position, in a traveling direction of the magnetic moving body, different from the position where the first group of magnetoelectric conversion elements is disposed and that converts a change in a magnetic field, caused by a travel of the magnetic moving body, into a change in an electric quantity;
a first amplification circuit that amplifies, based on a first reference potential, a first output signal based on conversion into the electric quantity by the first group of magnetoelectric conversion elements and then outputs a first amplification signal;
a second amplification circuit that amplifies, based on a second reference potential, a second output signal based on conversion into the electric quantity by the second group of magnetoelectric conversion elements and then outputs a second amplification signal;

a first comparison circuit that compares the first amplification signal with a first threshold value and then outputs a binarized, first comparison signal;
a second comparison circuit that compares the second amplification signal with a second threshold value and then outputs a binarized, second comparison signal;
a first reference potential adjusting apparatus that can adjust the first reference potential in the first amplification circuit;
a second reference potential adjusting apparatus that can adjust the second reference potential in the second amplification circuit;
a first analogue/digital conversion circuit that converts the first amplification signal into a digital value; and
a second analogue/digital conversion circuit that converts the second amplification signal into a digital value,
wherein at least one of the following is implemented:
(1) the second analogue/digital conversion circuit converts the second amplification signal into a digital value at a time when the peak value or the bottom value of the first output signal is detected, and then the second reference potential adjusting apparatus adjusts the second reference potential, based on comparison between a predetermined reference value and said digital value obtained through the conversion; and
(2) the first analogue/digital conversion circuit converts the first amplification signal into a digital value at a time when the peak value or the bottom value of the second output signal is detected, and then the first reference potential adjusting apparatus adjusts the first reference potential, based on comparison between a predetermined reference value and said digital value obtained through the conversion.

9. The magnetic detection apparatus according to claim 8, wherein there exists a phase difference between the first amplification signal and the second amplification signal in such a way that at a time when any one of the first amplification signal and the second amplification signal is at the peak or the bottom value thereof, the other one of the first amplification signal and the second amplification signal is at the amplitude center thereof.

10. The magnetic detection apparatus according to claim 8, wherein based on a clock from an oscillator, the first analogue/digital conversion circuit converts the first amplification signal into two or more digital values at different times, and the peak value or the bottom value of the first amplification signal is determined based on an increase or a decrease between said two or more digital values obtained through the conversion.

11. The magnetic detection apparatus according to claim 10, wherein a predetermined hysteresis is provided in the determination on an increase or a decrease between said two or more digital values.

12. The magnetic detection apparatus according to claim 8, wherein based on the respective digital values of the peak value and the bottom value of the first amplification signal or the second amplification signal, the first reference potential adjusting apparatus or the second reference potential adjusting apparatus adjusts the first reference potential or the second reference potential.

13. The magnetic detection apparatus according to claim 12, wherein the first reference potential adjusting apparatus or the second reference potential adjusting apparatus adjusts the first reference potential or the second reference potential, based on comparison between a predetermined reference value and the average value of the respective digital values of the peak value and the bottom value.

14. The magnetic detection apparatus according to claim 8, further including:
- a direction determination circuit that determines a traveling direction of the magnetic moving body, based on the first comparison signal and the second comparison signal; and
- an output circuit that outputs a rectangular wave that is in synchronization with the first comparison signal or the second comparison signal and whose time width differs depending on the traveling direction,
- wherein at a time when after initialization by a reset circuit, the rising time and the falling time of the first comparison signal and the falling time and the rising time of the second comparison signal, as the case may be, alternately appear, the output circuit starts outputting.

15. The magnetic detection apparatus according to claim 8, further including:
- a direction determination circuit that determines a traveling direction of the magnetic moving body, based on the first comparison signal and the second comparison signal, and
- an output circuit that outputs a rectangular wave that is in synchronization with the first comparison signal or the second comparison signal and whose voltage value differs depending on the traveling direction,
- wherein at a time when after initialization by a reset circuit, the rising time and the falling time of the first comparison signal and the falling time and the rising time of the second comparison signal, as the case may be, alternately appear, the output circuit starts outputting.

16. The magnetic detection apparatus according to claim 8, further including an output circuit that outputs a rectangular wave, in synchronization with the first comparison signal and the second comparison signal,
- wherein after initialization by a reset circuit, the output circuit starts outputting at a predetermined falling time or rising time of the first comparison signal or the second comparison signal.

17. The magnetic detection apparatus according to claim 8, wherein an operation of the second analogue/digital conversion circuit or the first analogue/digital conversion circuit is performed only in a predetermined period after initialization by a reset circuit.

18. The magnetic detection apparatus according to claim 8,
- wherein in the case where when Top1, Top2, and T denote a conversion time in which the first analogue/digital conversion circuit converts an analogue signal into a digital signal, a conversion time in which the second analogue/digital conversion circuit converts an analogue signal into a digital signal, and a changing period of a magnetic field for one-period travel of the magnetic moving body, respectively, the equation "Top1=Top2" is established, the relationship "Top1=Top2=T/6" is satisfied.

* * * * *